US012533665B2

(12) United States Patent
Liu et al.

(10) Patent No.: US 12,533,665 B2
(45) Date of Patent: Jan. 27, 2026

(54) SINTER RESISTANT METAL SPECIES IN ZEOLITES

(71) Applicant: ExxonMobil Technology and Engineering Company, Spring, TX (US)

(72) Inventors: Lichen Liu, Valencia (ES); Avelino Corma Canos, Valencia (ES)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 794 days.

(21) Appl. No.: 17/311,516

(22) PCT Filed: Jan. 14, 2020

(86) PCT No.: PCT/EP2020/050792
§ 371 (c)(1),
(2) Date: Jun. 7, 2021

(87) PCT Pub. No.: WO2020/148269
PCT Pub. Date: Jul. 23, 2020

(65) Prior Publication Data
US 2022/0016611 A1    Jan. 20, 2022

(30) Foreign Application Priority Data

Jan. 16, 2019    (EP) ..................... 19382024

(51) Int. Cl.
*B01J 29/74*        (2006.01)
*B01J 29/16*        (2006.01)
(Continued)

(52) U.S. Cl.
CPC .............. *B01J 29/74* (2013.01); *B01J 29/16* (2013.01); *B01J 29/44* (2013.01); *B01J 29/46* (2013.01);
(Continued)

(58) Field of Classification Search
CPC .. C07C 5/3337; C07C 2529/74; B01J 35/002; B01J 35/023; B01J 37/02; B01J 37/04;
(Continued)

(56) References Cited

U.S. PATENT DOCUMENTS 4,247,416 A    1/1981   Doherty et al.
4,585,747 A    4/1986   Valyocsik
(Continued)

FOREIGN PATENT DOCUMENTS

CN    101687184 A    3/2010
CN    102119123 A    7/2011
(Continued)

OTHER PUBLICATIONS

Wang et al. "In Situ Confinement of Ultrasmall Pd Clusters within Nanosized Silicate-1 Zeolite for Highly Efficient Catalysis of Hydrogen Generation" J. Am. Chem. Soc. 2016, 138, 7484-7487 with Supporting Information S1-S35 (Year: 2016).*
(Continued)

*Primary Examiner* — Keling Zhang
(74) *Attorney, Agent, or Firm* — Shook, Hardy & Bacon L.L.P.

(57) ABSTRACT

Medium or large pore synthetic zeolites are provided comprising at least 0.02 wt %, based on the weight of the zeolite, of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, which is present as catalytic metal particles, wherein at least 60% by number of said catalytic metal particles have a particle size of 2.0 nm or less, and at least 0.005 wt %, based on the weight of the zeolite, of an alkali metal or alkaline earth metal selected from the group consisting of Li, Na, K, Cs, Ca, Mg, Ba and Sr and combinations thereof, wherein, if the zeolite comprises in the zeolite framework a trivalent element Y selected
(Continued)

from the group consisting of Al, B, Ga Fe and combinations thereof, the $SiO_2:Y_2O_3$ ratio is greater than 200:1.

21 Claims, 23 Drawing Sheets

(51) Int. Cl.

| | |
|---|---|
| B01J 29/44 | (2006.01) |
| B01J 29/46 | (2006.01) |
| B01J 35/45 | (2024.01) |
| B01J 35/70 | (2024.01) |
| B01J 37/04 | (2006.01) |
| B01J 37/08 | (2006.01) |
| C07C 5/333 | (2006.01) |
| B01J 35/30 | (2024.01) |

(52) U.S. Cl.
CPC ........... *B01J 29/7476* (2013.01); *B01J 35/45* (2024.01); *B01J 35/70* (2024.01); *B01J 37/04* (2013.01); *B01J 37/082* (2013.01); *C07C 5/3337* (2013.01); *B01J 35/30* (2024.01); *B01J 2229/18* (2013.01); *B01J 2235/00* (2024.01); *B01J 2235/15* (2024.01); *B01J 2235/30* (2024.01); *C07C 2529/74* (2013.01)

(58) Field of Classification Search
CPC .................. B01J 37/082; B01J 2229/18; B01J 2229/186; B01J 29/064; B01J 29/068; B01J 29/072; B01J 29/076; B01J 29/16; B01J 29/185; B01J 29/20; B01J 29/22; B01J 29/24; B01J 29/26; B01J 29/405; B01J 29/42; B01J 29/44; B01J 29/46; B01J 29/48; B01J 29/602; B01J 29/61; B01J 29/62; B01J 29/63; B01J 29/64; B01J 29/655; B01J 29/66; B01J 29/67; B01J 29/68; B01J 29/69; B01J 29/7057; B01J 29/7069; B01J 29/7073; B01J 29/7076; B01J 29/7088; B01J 29/7092; B01J 29/7096; B01J 29/7215; B01J 29/7246; B01J 29/7253; B01J 29/7269; B01J 29/7276; B01J 29/7284; B01J 29/7292; B01J 29/74; B01J 29/7415; B01J 29/7446; B01J 29/7453; B01J 29/7476; B01J 29/7484; B01J 29/7492; B01J 29/7615; B01J 29/7646; B01J 29/7653; B01J 29/7676; B01J 29/7684; B01J 29/7692; B01J 29/7815; B01J 29/7846; B01J 29/7853; B01J 29/7876; B01J 29/7884; B01J 29/7892
USPC ...................... 502/60, 61, 73, 74, 77, 78, 79
See application file for complete search history.

(56) References Cited

U.S. PATENT DOCUMENTS

| | | | |
|---|---|---|---|
| 4,640,829 A | 2/1987 | Rubin | |
| 4,698,218 A | 10/1987 | Belot et al. | |
| 5,455,020 A | 10/1995 | Vaughan et al. | |
| 2010/0197986 A1* | 8/2010 | Midorikawa | B01J 37/0045 502/64 |
| 2013/0296625 A1* | 11/2013 | Ghosh | B01J 29/44 502/66 |
| 2017/0036197 A1 | 2/2017 | Kegnaes et al. | |
| 2020/0206717 A1* | 7/2020 | Dubois | B01J 20/16 |

FOREIGN PATENT DOCUMENTS

| | | | | |
|---|---|---|---|---|
| CN | 105377424 A | 3/2016 | | |
| CN | 108431179 A | 8/2018 | | |
| EP | 142352 B1 * | 7/1992 | | B01J 29/62 |
| WO | 2017/202495 A1 | 11/2017 | | |

OTHER PUBLICATIONS

Jarvis et al., Catalytic aromatization of naphtha under methane environment: Effect of surface acidity and metal modification of HZSM-5, Fuel, 2018 (Year: 2018).*

Hien N. Pham et al., "Role of SN in the Regenerataion of Pt/y-Al2O3 Light Alkane Dehydrogenation Catalysts", ACS Catalysis, 2016, pp. 2257-2264, vol. 6.

Ning Wang et al., "In Situ Confinement of Ultrasmall Pd Clusters within Nanosized Silicalite-1 Zeolite for Highly Efficient Catalysis of Hydrogen Generation", Journal of the American Chemical Society, Jun. 8, 2016, pp. 7484-7487, vol. 138.

Qiming Sun et al., "Subnanometric Hybrid Pd-M(OH)2, M = Ni, Co,Clusters in Zeolites as Highly EfficientNanocatalysts for Hydrogen Generation", Chem, Sep. 1, 2017, pp. 477-493, vol. 3 No. 3.

Bin Wang et al., "Preparation of Hierarchical Porous Silicalite-1 Encapsulated Ag NPs and Its Catalytic Performance for 4-Nitrophenol Reduction", Nanoscale Research Letters, Springer Link, Jun. 7, 2018, pp. 1-7, vol. 13 No. 1.

Manuel Moliner et al., "Reversible Transformation of Pt Nanoparticles into Single Atoms inside High-Silica Chabazite Zeolite", Journal of the American Chemical Society, Nov. 23, 2016, pp. 15743-15750, vol. 138 No. 48.

Minkee Choi et al., "Mercaptosilane-Assisted Synthesis of Metal Clusters within Zeolites and Catalytic Consequences of Encapsulation", Journal of the American Chemical Society, Jul. 7, 2010, pp. 9129-9137, vol. 132 No. 26.

International Search Report and Written Opinion received for PCT Patent Application No. PCT/EP2020/050792, mailed on Feb. 21, 2020, 15 pages.

Li, J., "Introduction to Green Chemistry", Wuhan University Press, Aug. 2015, pp. 97. (Cited in Rejection Decision received in 202080009223.8 dated Jun. 28, 2024).

Liu et al., "Generation of Subnanometric Platinum with High Stability During Transformation of a 2D Zeolite into 3D", Nature Materials, vol. 16, Sep. 26, 2016, 10 pages.

Office Action received for Chinese Patent Application No. 202080009223.8, mailed on Aug. 11, 2023, 14 pages (5 pages of English Translation and 9 pages of Original Office Action).

Office Action received for Chinese Patent Application No. 202080009223.8, mailed on Jun. 28, 2024, 14 pages (4 pages of English Translation and 10 pages of Original Office Action).

Office Action received for Chinese Patent Application No. 202080009223.8, mailed on Mar. 13, 2024, 15 pages (9 pages of English Translation and 6 pages of Original Office Action).

Office Action received for Japanese Patent Application No. 2021-541091, mailed on Sep. 5, 2023, 9 pages (4 pages of English Translation and 5 pages of Original Office Action).

Wu, Z., "Principles of Catalysis with Application in Energy Conversion", China University of Petroleum Press, Jul. 2018, pp. 137. (Cited in Rejection Decision received in 202080009223.8 dated Jun. 28, 2024).

* cited by examiner

SINTER RESISTANT METAL SPECIES IN ZEOLITES

CROSS-REFERENCE TO RELATED APPLICATIONS

This application is a national stage application under 35 USC 371 of International Application No. PCT/EP2020/050792 filed on Jan. 14, 2020, which claimed the benefit and priority to European Application No. 19382024.8, filed 16 Jan. 2019, the disclosure of European Application No. 19382024.8 being incorporated herein in its entirety.

FIELD OF THE INVENTION

The present invention relates to a medium or large pore synthetic zeolite comprising a catalytic metal, and an alkali metal, to processes for making such a synthetic zeolite and to processes involving converting hydrocarbon feedstocks using a catalyst comprising the synthetic zeolite.

BACKGROUND OF THE INVENTION

Zeolites are a class of crystalline microporous oxide materials with well-defined pores and cavities. Although their chemical composition was first limited to aluminosilicate polymorphs, many more heteroatoms such as B, P, As, Sn, Ti, Fe, Ge, Ga, Be and Zn, among others, can now be introduced into zeolitic frameworks in addition to Si and Al.

Zeolites, both natural and synthetic, have been demonstrated in the past to be useful as adsorbents and to have catalytic properties for various types of hydrocarbon conversion reactions. Zeolites are ordered, porous crystalline materials having a definite crystalline structure as determined by X-ray diffraction (XRD). Within the crystalline zeolite material there are a large number of cavities which may be interconnected by a number of channels or pores. These cavities and pores are uniform in size within a specific zeolite material. Because the dimensions of these pores are such as to accept for adsorption molecules of certain dimensions while rejecting those of larger dimensions, these materials are utilized in a variety of industrial processes.

Zeolites can be described as rigid three-dimensional framework of $TO_4$ tetrahedra (T=Si, Al, P, Ti, etc.). The tetrahedra are cross-linked by the sharing of oxygen atoms with the electrovalence of the tetrahedra containing trivalent element (e.g., aluminum or boron) or divalent element (e.g., Be or Zn) being balanced by the inclusion in the crystal of a cation, for example, a proton, an alkali metal or an alkaline metal cation. This can be expressed wherein the ratio of the Group 13 element (e.g., aluminum or boron) to the number of various cations, such as $H^+$, $Ca^{2+}*2$, $Sr^{2+}*2$, $Na^+$, $K^+$, or $Li^+$, is equal to unity.

Zeolites that find application in catalysis include any of the naturally occurring or synthetic crystalline zeolites. Examples of these zeolites include large pore zeolites, medium pore size zeolites, and small pore zeolites. These zeolites and their isotypes are described in "Atlas of Zeolite Framework Types", eds, Ch. Baerlocher, L. B. McCusker, D. H. Olson, Elsevier, Sixth Revised Edition, 2007, which is hereby incorporated by reference. A large pore zeolite generally has a pore size of at least about 7.0 Å and includes LTL, MAZ, FAU, OFF, *BEA, and MOR framework type zeolites (IUPAC Commission of Zeolite Nomenclature). Examples of large pore zeolites include mazzite, offretite, zeolite L, zeolite Y, zeolite X, omega, and beta. A medium pore size zeolite generally has a pore size from 5.0 Å to less than about 7.0 Å and includes, for example, MFI, MEL, EUO, MTT, MFS, AEL, AFO, HEU, FER, MWW, and TON framework type zeolites (IUPAC Commission of Zeolite Nomenclature). Examples of medium pore size zeolites include ZSM-5, ZSM-11, ZSM-22, MCM-22, silicalite 1, and silicalite 2. A small pore size zeolite has a pore size from about 3 Å to less than about 5.0 Å and includes, for example, CHA, ERI, KFI, LEV, SOD, and LTA framework type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, chabazite, zeolite T, and ALPO-17.

Synthesis of zeolites typically involves the preparation of a synthesis mixture which comprises sources of all the elements present in the zeolite, often with a source of hydroxide ion to adjust the pH. In many cases a structure directing agent (SDA) is also present. Structure directing agents are compounds which are believed to promote the formation of zeolite frameworks and which are thought to act as templates around which certain zeolite structures can form and which thereby promote the formation of the desired zeolite. Various compounds have been used as structure directing agents including various types of quaternary ammonium cations.

The synthesis of zeolites is a complicated process. There are a number of variables that need to be controlled in order to optimize the synthesis in terms of purity, yield and quality of the zeolite produced. A particularly important variable is the choice of synthesis template (structure directing agent), which usually determines which framework type is obtained from the synthesis. Quaternary ammonium ions are typically used as the structure directing agents in the preparation of zeolite catalysts. For example, zeolite MCM-68 may be made from quaternary ammonium ions as is described in U.S. Pat. No. 6,049,018. Other known zeolites that are typically produced using quaternary ammonium ions include ZSM-25, ZSM-48, ZSM-57, ZSM-58, and ECR-34, as described in U.S. Pat. Nos. 4,247,416, 4,585,747, 4,640,829, 4,698,218, and 5,455,020.

The "as-synthesized" zeolite will contain the structure directing agent in its pores, and is usually subjected to a calcination step to burn out the structure directing agent and free up the pores. For many catalytic applications, it is also desirable to include metal cations such as metal cations of Groups 2 to 15 of the Periodic Table of the Elements within the zeolite structure. This is typically accomplished by ion exchange treatment.

Zeolites are often used in industrial catalysts as supports for catalytic metals. Such catalytic metals, for example platinum and rhodium, are key components of refinery catalysts, as they enable the activation of C—H, H—H and C═C bonds, amongst others. Metals also play an important role in palliating catalyst deactivation by coke in acid catalyzed processes, using hydrogen to maintain the catalyst surface clean of heavy hydrocarbons. At the high operating temperatures of these transformations, and in the presence of strong reductants such as hydrogen, a major problem emerges due to gradual reorganization of the metal into the form of larger (thermodynamically more stable) metal particles, which implies a loss in the effective number of sites available for catalysis. Moreover, such catalysts often require periodic regeneration routines to eliminate residual heavy hydrocarbons from the catalyst surface, using air and high temperatures to complete the combustion process. The use of $H_2/O_2$ cycles along the catalyst lifetime aggravates the metal sintering problem.

Currently a number of methods are available for the production of metal catalysts supported on zeolites. Today, most supported metal catalysts are prepared by ion exchange or incipient wetness impregnation of the support. In each case the goal is to place the metal inside the pores of the support without an agglomeration of metal particles on the external surface of the support. Since the metals are typically introduced as cation precursors, they can ion exchange with the cations associated with the ionic framework, in particular with the trivalent elements, such as Al in an aluminosilicate material, or tetravalent elements such as Si in a silicoaluminophosphate material. The association of the positively charged metal cation with negatively charged anionic sites within the pores and/or cavities of the zeolite allows for an initial high dispersion of the metal. Some applications, however, require minimization or elimination of Brönsted acidity due to anionic trivalent framework heteroatoms, such as Al, which makes difficult the incorporation and stabilization of extra-framework metal cations. This is particularly challenging when the extra-framework metal loading is high and the metal is multiply charged. It would, thus, be desirable to incorporate metals inside zeolites which have a very low content of trivalent element, such as Al, and particularly inside highly siliceous zeolites.

SUMMARY OF THE INVENTION

In one aspect the invention provides a medium or large pore synthetic zeolite comprising the following:
  a. at least 0.02 wt %, based on the weight of the zeolite, of at least one catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, which is present as catalytic metal particles, wherein at least 60% by number of said catalytic metal particles have a particle size of 2.0 nm or less, and
  b. at least 0.005 wt %, based on the weight of the zeolite, of at least one alkali metal or alkaline earth metal selected from the group consisting of Li, Na, K, Cs, Ca, Mg, Ba and Sr and mixtures thereof,
wherein, if the zeolite comprises a trivalent metal element Y selected from Al, B, Ga, Fe and combinations thereof, in the framework, the $SiO_2$:$Y_2O_3$ ratio is greater than 200:1, optionally greater than 300:1, optionally greater than 500:1, optionally greater than 1000:1.

In a yet further aspect the invention provides a catalyst comprising the medium or large pore synthetic zeolite of the invention and at least 0.1 wt % based on the weight of the catalyst of a binder.

In another aspect the invention provides a process for the preparation of a medium or large pore synthetic zeolite comprising: providing a synthesis mixture capable of forming the medium or large pore synthetic zeolite framework, the synthesis mixture comprising at least a source of Si, at least one catalytic metal precursor comprising a source of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof and a source of at least one alkali metal or alkaline earth metal selected from the group consisting of Li, Na, K, Cs, Ca, Mg, Ba and Sr and mixtures thereof, and wherein, if a trivalent metal element Y selected from Al, B, Ga, Fe and combinations thereof is present, the $SiO_2$:$Y_2O_3$ ratio is greater than 200:1, optionally greater than 300:1, optionally greater than 500:1, optionally greater than 1000:1,
  a. heating said synthesis mixture under crystallization conditions to form crystals of said synthetic zeolite, and
  b. recovering said crystals of the medium or large pore synthetic zeolite from the synthesis mixture.

The invention also provides, in a yet further aspect, a use of the medium or large pore synthetic zeolite of the invention as a sorbent or catalyst.

The invention also provides, in a yet further aspect, a process for converting a feedstock comprising an organic compound to a conversion product which comprises the step of contacting said feedstock with a catalyst comprising a medium or large pore synthetic zeolite of the invention.

Where the synthesis mixture comprises a structure directing agent (SDA) the crystals of the medium or large pore synthetic zeolite recovered from the synthesis mixture will include the SDA in the pores and cavities of the zeolite (that is, in "as made" form). The processes for the preparation of the synthetic zeolite of the invention may further include a step of subjecting the synthetic zeolite recovered from the synthesis mixture to a calcination step. The calcination step removes the structure directing agent and provides the zeolite in calcined form. The calcination step also removes any ligands used to stabilize the metal during the crystallization step.

DETAILED DESCRIPTION OF THE INVENTION

Figure 1:
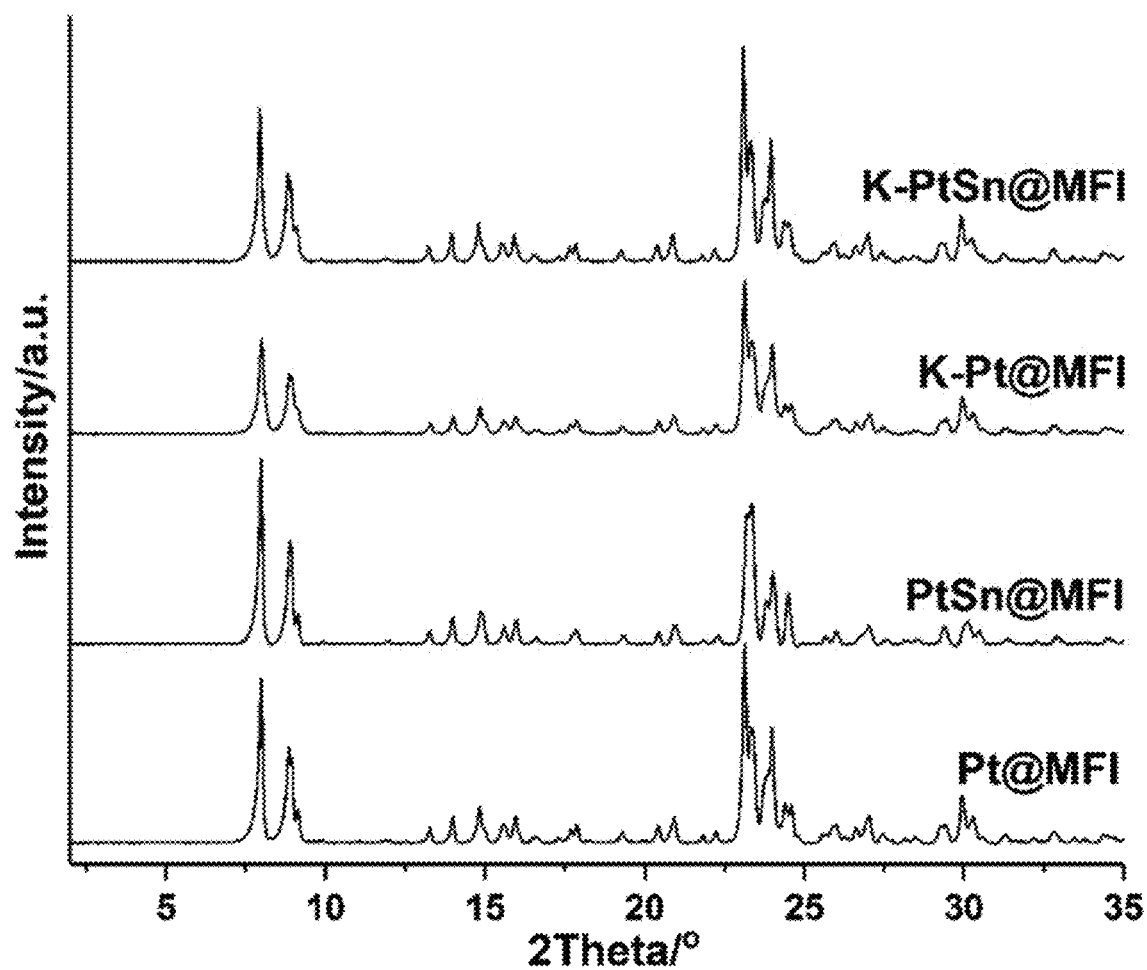
FIG. 1 shows XRD patterns of the Pt-zeolite samples from Examples 1 to 4.

The present inventors have found that it is possible to synthesize medium and large pore zeolites, in particular silicate zeolites, having a catalytic metal present in encapsulated form inside the pores and/or cavities of the zeolite and also having an alkali metal or alkaline earth metal present. Without wishing to be bound by theory, the inventors believe that the encapsulation of the catalytic metal and the alkali metal within the medium or large pore synthetic zeolites, in particular within the pores and/or cavities of synthetic zeolites, limits the growth of the catalytic metal species to small particles, for example, catalytic metal particles having a largest dimension of less than 2.0 nm, for instance a biggest dimension in the range between 0.2 and 2.0 nm, such as between 0.5 and 1.0 nm, and prevents significant growth of those particles thereby providing an improved resistance to sintering, even when trivalent framework heteroatoms, such as Al, are not present. The term "metal particle" as used herein should be understood to include clusters of metal atoms or single metal atoms as well as larger metal particles. Noble metal species on conventional zeolites or silica supports, in contrast, generally exhibit sintering and therefore growth of the metal particles under high temperature cycles of reduction and oxidation which leads to a reduction in the number of catalytic sites and the activity of the catalyst. In addition, the zeolites of the invention may have advantages in selectivity in organic conversion reactions and in resistance to catalyst poisons, when the poison is in the form of molecules large enough as not to diffuse through the pore of the medium or large pore zeolite and reach the catalytic metal function.

The term "synthetic zeolite" should be understood to refer to a zeolite which has been prepared from a synthesis mixture as opposed to being a naturally occurring zeolite which has been obtained by mining or quarrying or similar processes from the natural environment.

The term "small pore size synthetic zeolite" as used herein refers to a synthetic zeolite wherein the pores of the zeolite have a size in the range of from 3.0 Å to less than 5.0 Å. The small pore size synthetic zeolite will generally have an 8-membered ring framework structure but some 9- or 10-membered ring zeolites are known to have distorted rings which have a size in the range of from 3.0 to 5.0 Å and fall within the scope of the term "small pore size synthetic zeolite" as used herein. The term "medium pore size synthetic zeolite" as used herein refers to a synthetic zeolite wherein of the zeolite has pores of a size in the range of from 5.0 Å to less than 7.0 Å, optionally 5.1 Å to less than 7.0 Å, optionally, 5.2 Å to less than 7.0 Å. The medium pore size synthetic zeolite will generally have a 10 or more-membered ring framework structure. The medium pore size synthetic zeolite is optionally a 10-membered ring zeolite. The term "large pore size synthetic zeolite" as used herein refers to a synthetic zeolite wherein the pores of the zeolite have a size of at least 7.0 Å, for example, from 7.0 Å to 9.0 Å. The large pore size synthetic zeolite will generally have a 10 or 12-membered ring framework structure. Optionally, the large pore size synthetic zeolite is a 12-membered ring zeolite. Some zeolites have two or more different sizes of pores. In that case, the designation of the zeolite as being small, medium or large pore is based upon the size of the largest pore in the zeolite framework. For example, a zeolite may have both 8-member ring pores having a size in the range of from 3.0 Å to less than 5.0 Å and 10-member ring pores of a size in the range of from 5.0 Å to less than 7.0 Å and it would then be regarded as a medium pore size zeolite. For the purpose of the present invention, any zeolite, of which the largest pore type within the zeolite structure has a size in the range of from 5.0 Å to less than 7.0 Å, is a medium pore size zeolite, although preferably the zeolite is one having only pores within that range. For the purpose of the present invention, any zeolite, of which the largest pore type within the zeolite structure has a size of at least 7.0 Å, is a large pore size zeolite, although preferably the zeolite is one having only pores within that range.

A number of zeolites are listed in the "Atlas of Zeolite Framework Types", eds, Ch. Baerlocher, L. B. McCusker, D. H. Olson, Elsevier, Sixth Revised Edition, 2007.

Optionally, the medium or large pore size synthetic zeolite of the invention is a medium pore zeolite of framework type MWW, TON, MTT, DON, BEA, BEC, MFI, MEL, MRE, MTW, FER, EUO, AFI, BOX, CON, ISV, ITN, GON, IFR, IFW, IWV, ITH, MEI, IWW, NES, RRO, SEW, SFE, SFG, SFF, SFN, SFH, SSY, SSF, SFS, SVR, STT, STW, STF, EWT, UOV, TON, or SFV. Advantageously, the medium or large pore size synthetic zeolite of the invention is a medium pore zeolite of framework type MFI, EUO, MTT, AFO, MEL, MFS, FER, TON or MWW; or is a large-pore zeolite of framework type FAU, BEA, BEC, MOR and LTL. Preferably, the medium or large pore zeolite is of framework type MFI, MWW, BEA, or FER. MFI is particularly preferred. The zeolite framework type may optionally be a framework type which can be synthesized without requiring the presence of a structure directing agent. In an alternative embodiment the synthetic zeolite may be of a framework type which requires the presence of a structure directing agent in the synthesis mixture.

The medium or large pore synthetic zeolite of the invention is preferably a silicate zeolite. The zeolite of the invention may include in its framework low levels of one or more trivalent elements Y, selected from Al, B, Ga, Fe, and combinations thereof arising from impurities in the components of the synthesis mixture. For example, some sources of silica may contain aluminum oxides as an impurity. If the medium or large pore synthetic zeolite is a pure silicate, it has an $Y_2O_3:SiO_2$ molar ratio that is 0 or a $SiO_2:Y_2O_3$ molar ratio that is infinite (i.e. no $Y_2O_3$). If one or more trivalent elements Y is present in the medium or large pore synthetic zeolite, the zeolite has a $SiO_2:Y_2O_3$ molar ratio of greater than 200:1, preferably greater than 300:1, more preferably greater than 400:1, most preferably greater than 500:1, in particular greater than 1000:1. For the purposes of defining the invention, where the zeolite framework includes more than on trivalent metal Y selected from Al, B, Ga and Fe the ratio $SiO_2:Y_2O_3$ is based on the metal Y which has the highest molar concentration in the framework. Optionally, if Al is present in the zeolite framework, the zeolite has a $SiO_2:Al_2O_3$ molar ratio of greater than 250:1, preferably greater than 300:1, more preferably greater than 400:1, most preferably greater than 500:1, in particular greater than 1000:1. Optionally, if B is present in the zeolite framework, the zeolite has a $SiO_2:B_2O_3$ molar ratio of greater than 250:1, preferably greater than 300:1, more preferably greater than 400:1, most preferably greater than 500:1, in particular greater than 1000:1. Optionally, if Ga is present in the zeolite framework, the zeolite has a $SiO_2:Ga_2O_3$ molar ratio of greater than 250:1, preferably greater than 300:1, more preferably greater than 400:1, most preferably greater than 500:1, in particular greater than 1000:1. Optionally, if Fe is present in the zeolite framework, the zeolite has a $SiO_2:Fe_2O_3$ molar ratio of greater than 250:1, preferably greater than 300:1, more preferably greater than 400:1, most preferably greater than 500:1, in particular greater than 1000:1. While the presence of trivalent metals such as aluminum within the zeolite framework structure does contribute acidic sites to the catalyst it also is associated with a reduction in thermal stability of the zeolite and the acidic sites can increase the degree of coking experienced during use.

The medium or large pore synthetic zeolite optionally has a degree of crystallinity of at least 75%, optionally 80%, optionally at least 90%, preferably at least 95% and most preferably at least 98%. In one embodiment the medium or large pore synthetic zeolite is essentially pure crystalline material. The degree of crystallinity may be calculated via x-ray diffraction (XRD) by comparison with a reference material of known 100% crystalline material of the same framework type, the same composition, the same or similar particle size and containing the same amount of metals prepared by an incipient wetness technique. The catalytic metal is primarily extra-framework metal and is in the form of metal particles that will tend to scatter x-rays. Therefore in order to obtain fully comparable results to calculate the degree of crystallinity it is important that the reference material contains the same amount of the same metals as present in the medium or large pore size synthetic zeolite.

The medium or large pore synthetic zeolite comprises a catalytic metal, selected from the group consisting of Ru, Rh, Pd, Ag, Os, Ir, Pt, Au, Mo, W, Re, Co, Ni, Zn, Cr, Mn, Ce, Ga, Cu and combinations thereof. Although for the purposes of defining the invention, the zeolite of the invention is considered to comprise the catalytic metal, typically, the catalytic metal is extra-framework metal, that is, the catalytic metal generally does not form part of the framework of the synthetic zeolite, i.e. of the three-dimensional framework of tetrahedra of the synthetic zeolite. The amount of metal is determined by X-ray fluorescence (XRF) or inductively coupled plasma (ICP) and is expressed as wt % of the metal (based on the elemental form of the metal, and not, for example, the oxide form) in the total sample. Optionally, the medium or large pore size synthetic zeolite comprises at least 0.02 wt, optionally at least 0.05 wt %, preferably from 0.05 to 5.0 wt % of the catalytic metal, preferably from 0.1 to 3.0 wt %, more preferably from 0.2 to 2.5 wt %, most preferably from 0.2 to 2.0 wt %.

The catalytic metal may be selected from group consisting of Ru, Rh, Pd, Ag, Ir, Pt, Au, Re, Co, Ni, and combinations thereof; more preferably from the group consisting of Ru, Rh, Pd, Ag, Os, Ir, Pt, Au, Re, and combinations thereof; most preferably from the group consisting of Pt, Rh, Pd and Au and combinations thereof, especially from the Pt, Pd and/or Rh. Pt and Rh are especially preferred catalytic metals, particularly Pt.

Typically, the catalytic metal will be present in the form of metal particles, which includes metal clusters as well as site-isolated single metal atoms (the catalytic metal may be present in the particles and/or clusters as elemental metal or as the metal oxide). In the zeolite of the invention the catalytic metal is present in the form of particles wherein at least 60%, optionally at least 70%, optionally at least 80%, optionally at least 90% and in some cases at least 95% by number of said catalytic metal particles have a particle size of 2.0 nm or less. For the purpose of defining the invention, references to the "size" of the particles of the catalytic metal are to be understood as referring to the largest dimension of the particles as measured by electron microscopy. A range of electron microscopy techniques may be used to measure the longest dimension, such as Transition Electron Microscopy (TEM) and Scanning Transition Electron Microscopy (STEM), and references to TEM herein should be understood to encompass STEM. Preferably, at least 60%, optionally at least 70%, optionally at least 80%, optionally at least 90% and in some cases at least 95% by number of said catalytic metal particles have a size in the range of from 0.2 to 2.0 nm, for instance in the range from 0.5 to 1 nm. In the context of the present application, the expression "percentage of the particles by number" refers to the arithmetic average (mean) of number of particles having the required characteristic out of 100 particles, this value being determined on the basis of a population of at least one thousand particles. That population will preferably include all of the particles present in an image and the image will be selected to be representative of the sample as a whole. In the present application, the expression "biggest dimension" when discussing metal particle size means the biggest dimension as measured by TEM. In the case of substantially spherical particles, the biggest dimension of a particle will correspond to its diameter. In the case of irregular-shaped particles, the biggest dimension of a particle will correspond to the diameter of the smallest sphere that can fully contain the particle.

In an especially preferred embodiment, after thermal treatment of the medium or large pore size synthetic zeolite of the present invention by calcination in air at 600° C. for two hours and treatment with $H_2$ at 600° C. for two hours, the catalytic metal will still be present in the form of particles wherein at least 60%, optionally at least 70%, optionally at least 80%, optionally at least 90% and in some cases at least 95% of the particles by number have a biggest dimension of less than 2.0 nm as measured by TEM, in particular at least 60%, optionally at least 70%, optionally at least 80%, optionally at least 90% and in some cases at least 95% of the particles by number will preferably still have a biggest dimension in the range of from 0.2 to 2.0 nm, for instance from 0.5 to 1.0 nm, as measured by TEM.

Preferably, the average (mean) particle size by number of the particles of catalytic metal as measured by scanning transition electron microscopy (STEM) is 1.5 nm or less, more preferably 1.0 nm or less, optionally 0.8 nm or less. X-ray absorption fine structure spectroscopy (EXAFS) offers an alternative means of measuring average particle size of the particles of catalytic metal, by allowing a determination of the co-ordination number of the metal atoms. Preferably, the average (mean) particle size by number of the particles of catalytic metal as measured by X-ray absorption fine structure spectroscopy (EXAFS) is 2 nm or less, more preferably 1.0 nm or less, optionally 0.8 nm or less.

Optionally, the dispersion of the catalytic metal is at least 30%, optionally at least 40%, optionally at least 50%, for example at least 60% and in some cases at least 70%. Dispersion is a well-known parameter in the field of catalysis and is usually determined by quantifying how much of a specified gas can be adsorbed on the metal surface of a sample given a known adsorbate/metal stoichiometry and a known amount of metal in the sample. For example, for Pt, $H_2$ is adsorbed on the Pt with a stoichiometry of 1:1 for each atom of Pt on the external surface of the Pt particles. By measuring the amount of $H_2$ adsorbed and comparing with the known amount of Pt present, it is possible to calculate how much Pt is external. Catalytic metal particles which are located inside the zeolite, as opposed to being on the zeolite surface may be considered to be "encapsulated" in the zeolite and are therefore shielded from components of the feedstock which are too large to pass through the pores of the zeolite. In that way, comparison of the reaction rate of the catalysts towards a compound present in the feedstock which is small enough to pass through the zeolite pores relative to a chemically similar compound which is too large to pass through the zeolite pores can offer a measure of the degree of encapsulation of the catalytic metal. In an preferred embodiment, the percentage of the catalytic metal that is encapsulated in the zeolite (u) is determined by the following formula:

$$\alpha = \frac{\left[\frac{LR\ SiO2}{SR\ SiO2} - \frac{LR\ zeolite}{SR\ zeolite}\right]}{\left[\frac{LR\ SiO2}{SR\ SiO2}\right]} * 100$$

wherein α is the percentage of catalytic metal encapsulated in the zeolite, LR is the large feedstock reaction rate expressed as mol of large feedstock converted per mol of catalytic metal per second, SR is the small feedstock reaction rate expressed as mol of small feedstock converted per mol of catalytic metal per second. "LR zeolite" and "SR zeolite" are to be understood as the large feedstock and small feedstock rates of the catalyst to be tested, and "LR $SiO_2$" and "SR $SiO_2$" are to be understood as the 3-methylnitrobenzene and nitrobenzene rates of a catalyst having an equivalent metal loading in which the metal is supported on amorphous silica. Because α is the percentage of catalytic metal encapsulated in the zeolite based on the total amount of catalytic metal whether it is present in the zeolite or on the zeolite surface, α is an absolute percentage number regardless of whether the amount of metal in the zeolite or on the zeolite surface is expressed as amounts in weight or mole. For a hydrogenation catalysts comprising a medium pore size zeolite such as MFI, which has 10MR channels, nitrobenzene may be a suitable small feedstock compound and 3-methylnitrobenzene a suitable large feedstock compound. Optionally, the percentage of catalytic metal encapsulated by the zeolite, u, is at least 50%, optionally at least 60%, optionally at least 70%, optionally at least 90% and optionally at least 95%.

In some cases it is possible to identify more specifically the location of the particles of the catalytic metal in the zeolite structure, for example, by using a combination of integrated Differential Phase Contrast imaging (iDPC) and High-Angle Annular Dark Field imaging (HAADF). As an illustration, for MFI, it is possible to determine whether the catalytic metal is present in the sinusoidal channels, as opposed to the straight channels or intersectional voids. Optionally, where the zeolite is MFI, the percentage of catalytic metal which is within the sinusoidal channels at non-intersecting positions with the straight MFI channels is at least 60%, optionally at least 70%, optionally at least 90% and optionally at least 95%.

The medium or large pore synthetic zeolite of the invention also comprises at least one alkali metal or alkaline earth metal selected from the group consisting of Li, Na, K, and Cs, Ca, Mg, Ba and Sr. The alkali metal or alkaline earth metal is preferably an alkali metal selected from the group consisting of Li, Na, K and Cs, especially Na or K, preferably K. The zeolite of the invention optionally comprises at least 0.01 wt %, optionally at least 0.05 wt %, optionally at least 0.1 wt %, optionally at least 0.3 wt % of the alkali metal or alkaline earth metal, based on the weight of the zeolite. Optionally, the zeolite of the invention comprises from 0.01 wt % to 5.0 wt %, optionally from 0.1 wt % to 3.0 wt %, optionally from 0.2 to 1.5 wt % of the alkali metal or alkaline earth metal, based on the weight of the zeolite. Optionally, the molar ratio of the at least one catalytic metal to the at least one alkali metal or alkaline earth metal is between 0.2 and 10, optionally between 1.0 and 8.

The medium or large pore synthetic zeolite of the invention may further comprise one or more additional metals other than the catalytic metal and the at least one alkali metal or alkaline earth metal. Optionally, the synthetic zeolite comprises at least 0.01 wt %, optionally from 0.05 to 5.0 wt %, such as from 0.1 to 5.0 wt % of an additional extra-framework metal selected from the group consisting of Ga, Zn, Sn, Fe, Ti, Zr, Nb, Hf, Ta, Mo and combinations thereof. Sn is a preferred additional extra-framework metal. For example, the zeolite of the invention may comprise Pt as catalytic metal and Sn as additional extra-framework transition metal. Optionally, such extra framework metals are present in total in an amount of no more than 10 wt %, preferably no more than 5 wt %, preferably no more than 2 wt % of the zeolite. Optionally, the zeolite may also comprise an additional metal selected from the group consisting of Sn, Ti, Ge, Zr, Nb, Hf and combinations thereof in the framework as isomorphic Si-substituents. Optionally such isomorphic Si-substituents are present in total in an amount of no more than 10 wt %, preferably no more than 5 wt %, preferably no more than 2 wt % of the zeolite.

In the zeolite of the invention the catalytic metal, the alkaline metal or alkaline earth metal and the additional metal, if present, may be present in any suitable form, for example, in metallic elemental form, as oxides, or as salts. All weight percentages used herein in respect of the catalytic metal, the alkaline metal or alkaline earth metal or the additional metal should be understood as being based on the metal alone, rather than on the weight of the metal oxide or any other compound form of the metal.

In one embodiment the medium or large pore synthetic zeolite is a silicate wherein the catalytic metal is selected from the group consisting of Pt, Rh, Pd and Au, and combinations thereof, in particular Pt, Pd and/or Rh, and wherein the zeolite is of framework type MFI.

In one embodiment the medium or large pore synthetic zeolite is in as-synthesized form and comprises a structure directing agent (SDA), in particular an organic structure directing agent (OSDA), within its pores.

In an alternative embodiment the medium or large pore synthetic zeolite does not comprise a structure directing agent. For example, the synthetic zeolite may be in calcined form.

The inventors have found that by careful design of the synthesis method it is possible to produce the medium or large pore synthetic zeolites of the invention in which the catalytic metal is to a large extent encapsulated in the zeolite. In one aspect the invention provides a process for the preparation of the synthetic zeolite of the invention comprising the steps of:

a. providing a synthesis mixture capable of forming the medium or large pore synthetic zeolite framework, the synthesis mixture comprising at least a source of Si, at least one catalytic metal precursor comprising a source of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof and a source of at least one of at least one alkali metal or alkaline earth metal selected from the group consisting of Li, Na, K, Cs, Ca, Mg, Ba and Sr and mixtures thereof, and wherein, if a trivalent metal element Y selected from Al, B, Ga, Fe, and combinations thereof is present, the $SiO_2:Y_2O_3$ ratio is greater than 200:1, b. heating said synthesis mixture under crystallization conditions to form crystals of said synthetic zeolite, and c. recovering said crystals of the medium or large pore synthetic zeolite from the synthesis mixture.

Preferably, the at least one catalytic metal precursor includes metal complexes stabilized by ligands selected from the group consisting of N-containing ligands, 0-containing ligands, S-containing ligands and P-containing ligands. In this embodiment of the process for the preparation of the medium or large pore synthetic zeolite the inventors believe, without wishing to be bound by theory, that the ligands stabilize the metal complex in the synthesis mixture, which is generally highly alkaline, such that it does not become part of the zeolite framework or precipitate from the solution to form large particles which cannot be encapsulated.

The ligand may be a O-containing ligand, such as oxalate ion or acetylacetonate ion. Alternatively, the ligand L may be a S-containing ligand, such as a thiol of the structure HS—$(CH_2)_x$—Si—$(OR)_3$, where x=1 to 5 and R=$C_1$ to $C_4$ alkyl, preferably methyl, ethyl, propyl, or butyl, most preferably x=3 and R=methyl or ethyl, or the S-containing ligand may be an alkyl thiol. Alternatively, the ligand may be a P-containing ligand, such as phosphine, for example, triphenylphosphine. Preferably, the ligand is a N-containing ligand, in particular an amine such as $NH_3$, ethylenediamine, diethylenetriamine, triethylenetetramine or tetraethylene pentamine, preferably selected from the group consisting of $NH_3$ and bidentate amines such as ethylene diamine and combinations thereof. The ligand should be chosen such that the catalytic metal precursor is stable in the highly alkaline conditions of the synthesis mixture, or in a fluoride media. In particular, the catalytic metal precursor should be stable against precipitation at the pH of the synthesis mixture under the conditions used to form the medium or large pore synthetic zeolite.

Optionally, the catalytic metal precursor is selected from the group consisting of $[Pt(NH_3)_4]Cl_2$, $[Pt(NH_3)_4](NO_3)_2$, $[Pd(NH_2CH_2CH_2NH_2)_2]Cl_2$, $[Rh(NH_2CH_2CH_2NH_2)_3]Cl_3$, $[Ir(NH_3)_5Cl]Cl_2$, $[Re(NH_2CH_2CH_2NH_2)_2O_2]Cl$, $[Ag(NH_2CH_2CH_2NH_2)]NO_3$, $[Ru(NH_3)_6]Cl_3$, $[Ir(NH_3)_6]Cl_3$, $[Ir(NH_3)_6](NO_3)_3$, $[Pt(NH_2CH_2CH_2NH_2)_2]Cl_2$ and $[Ir(NH_3)_5NO_3](NO_3)_2$.

The molar ratio of the catalytic metal precursor (in terms of metal): $SiO_2$ in the synthesis mixture is in the range of from 0.00001 to 0.030, preferably from 0.0001 to 0.010, more preferably from 0.0003 to 0.008. Optionally, the molar ratio of catalytic metal precursor (in terms of metal): $SiO_2$) is in the range of from 0.0001 to 0.001, preferably from 0.0002 to less than 0.001, more preferably from 0.0002 to 0.0005. Optionally, the catalytic metal precursor is selected from the group consisting of $H_2PtCl_6$, $H_2PtBr_6$, $Pt(NH_3)_4Cl_2$, $Pt(NH_3)_4(NO_3)_2$, $RuCl_3 \cdot xH_2O$, $RuBr3 \cdot xH_2O$, $RhCl_3 \cdot xH_2O$, $Rh(NO_3)_3 \cdot 2H_2O$, $RhBr_3 \cdot xH_2O$, $PdCl_2 \cdot xH_2O$, $Pd(NH_3)_4Cl_2$, $Pd(NH_3)_4B_{42}$, $Pd(NH_3)(NO_3)_2$, $AuCl_3$, $HAuBr_4 \cdot xH_2O$, $HAuCl_4$, $HAu(NO_3)_4 \cdot xH_2O$, $Ag(NO_3)_2$, $ReCl_3$, $Re_2O_7$, $OsCl_3$, $OsO_4$, $IrBr_3 \cdot 4H_2O$, $IrCl_2$, $IrCl_4$, $IrCl_3 \cdot xH_2O$, and $IrBr_4$, where x is from 1 to 18, preferably from 1 to 6.

In one embodiment the synthesis mixture capable of forming the medium or large pore synthetic zeolite framework comprises a source of Si, a source of an alkali metal or alkali earth metal selected from the group consisting of Li, Na, K, Cs, Ca, Mg, Ba and Sr and mixtures thereof, optionally a source of hydroxide ions and/or a source of halide ions, especially fluoride ions, optionally a source of a structure directing agent (SDA) (in particular a source of an organic structure directing agent (OSDA)), and water.

Suitable sources of silicon (Si) that can be used to prepare the synthesis mixture include silica; colloidal suspensions of silica, for example that sold by E.I. du Pont de Nemours under the tradename Ludox®; precipitated silica; alkali metal silicates such as potassium silicate and sodium silicate; tetraalkyl orthosilicates; and fumed silicas such as Aerosil and Cabosil.

Optionally, the synthesis mixture also contains a source of halide ions, which may be selected from the group consisting of chloride, bromide, iodide or fluoride, preferably fluoride. The source of halide ions may be any compound capable of releasing halide ions in the molecular sieve synthesis mixture. Non-limiting examples of sources of halide ions include hydrogen fluoride; salts containing one or several halide ions, such as metal halides, preferably where the metal is sodium, potassium, calcium, magnesium, strontium or barium; ammonium fluoride; or tetraalkylammonium fluorides such as tetramethylammonium fluoride or tetraethylammonium fluoride. If the halide ion is fluoride, a convenient source of halide ion is HF or $NH_4F$.

The synthesis mixture also contains a source of alkali metal or alkali earth metal selected from the group consisting of lithium, sodium, potassium, cesium, calcium, magnesium, barium, strontium (Li, Na, K, Cs, Ca, Mg, Ba and Sr) and mixtures thereof. The alkali metal or alkaline earth metal is preferably Na or K, preferably K. The alkali metal may be added in the form of a salt comprising alkali metal cations $M^+$ or alkaline earth metal cations $M^{2+}$. Suitable sodium sources include a sodium salt such as NaCl, NaBr, or $NaNO_3$; sodium hydroxide or sodium aluminate. Suitable potassium sources include potassium hydroxide or potassium halide such as KCl or NaBr, or potassium nitrate. The presence of alkali metal or alkaline earth metal is believed to lead to a reduction in the size of the particles of catalytic metal formed, as compared to a similar synthesis mixture not comprising the alkali metal or alkaline earth metal, thereby leading also to an increase in catalytic activity of the catalytic metal. The presence of alkali metal or alkaline earth metal is also believed to lead to an increase in the stability of the zeolite when used as a catalyst, and to promote the retention of catalytic activity over one or more regeneration cycles of the zeolite, as compared to a similar zeolite not including the alkali metal or alkaline earth metal.

Optionally, the synthesis mixture also contains a source of hydroxide ions, for example, an alkali metal hydroxide such as sodium hydroxide or potassium hydroxide. Hydroxide can also be present as a counter ion of the (organic) structure directing agent or by the use of sodium silicate or potassium silicate as the source of X. Sodium or potassium silicate can also be used as the source of alkali metal $M^+$ or alkaline earth metal $M^{+2}$.

The synthesis mixture optionally further comprises a structure directing agent (SDA), in particular an organic structure directing agent (OSDA). The nature of the SDA (or OSDA) will depend upon the desired framework type. Many such structure directing agents are known to the skilled person. The structure directing agent may be present in any suitable form, for example as a salt of a halide such as a chloride, iodide or bromide, as a hydroxide or as a nitrate. The structure directing agent will generally be cationic and preferably be an organic structure directing agent, for example, a nitrogen-containing cation such as a quaternary ammonium cation. For example, the OSDA may optionally be N,N,N-trimethyl-1-adamantammonium hydroxide or iodide (TMAdA) where it is desired to produce a zeolite of framework type CHA or 1,1'-(hexane-1,6-diyl)bis(1-methylpiperidinium) where it is desired to produce a zeolite of framework type AFX. For the MFI framework a typical OSDA is tetrapropyl ammonium hydroxide.

The synthesis mixture can have any composition which is suitable for preparing the desired zeolite framework. The following ranges are given as examples of desirable and preferred ranges for each pair of components in the synthesis mixture. Conveniently, the synthesis mixture does not comprise any source of the trivalent element Y but it is possible that one or more trivalent elements Y is or are present as impurities in which case the molar ratio of $SiO_2$:$Y_2O_3$ in the synthesis mixture may be in the range of from 200, preferably from 500, and in some cases from 1000 to infinity (i.e. no Y). Optionally, in the synthesis mixture the molar ratio of SDA:$SiO_2$ is in the range of from 0 to 1.0, optionally from 0.04 to 0.5, preferably from 0.08 to 0.6, for example, from 0.08 to 0.5. Optionally, in the synthesis mixture the molar ratio of $H_2O:SiO_2$ is in the range of from 1 to 100, preferably from 10 to 60. Optionally, in the synthesis mixture the molar ratio of $M^+/M^{2+}:SiO_2$ is 0.45 or lower, preferably from 0.002 to 0.20, optionally from 0.01 to 0.10. Optionally, in the synthesis mixture the molar ratio of $OH^-:SiO_2$ is in the range of from 0 to 1.0, preferably from 0.08 to 0.7, for example, in the range of from 0.08 to 0.5. Optionally, in the synthesis mixture the molar ratio of halide$^-:SiO_2$ is in the range of from 0 to 1, preferably from 0 to 0.5. The synthesis mixture may for example have a composition, expressed in terms of mole ratios, as indicated in the following Table:

| Mole ratio | Useful | Preferred |
|---|---|---|
| $SiO_2/Y_2O_3$ | 200 to ∞ | 500 ∞ |
| $SDA/SiO_2$ | 0 to 1.0 | 0.08 to 0.6 |
| $H_2O/SiO_2$ | 1 to 100 | 5 to 60 |
| $(M^+$ and $M^{2+})/SiO_2$ | 0.002 to 0.2 | 0.01 to 0.10 |
| $OH^-/SiO_2$ | 0 to 1.0 | 0.08 to 0.7 |
| Halide$^-/SiO_2$ | 0 to 1 | 0 to 0.5 |
| Catalytic metal/$SiO_2$ | 0.00001 to 0.030 | 0.0003 to 0.008 |

The synthesis may be performed with or without added nucleating seeds. If nucleating seeds are added to the synthesis mixture, the seeds are suitably present in an amount from about 0.01 ppm by weight to about 10,000 ppm by weight, based on the synthesis mixture, such as from about 100 ppm by weight to about 5,000 ppm by weight of the synthesis mixture. The seeds can for instance be of any suitable zeolite, in particular of a zeolite having the same framework as the zeolite to be obtained.

Crystallization can be carried out under either static or stirred conditions in a suitable reactor vessel, such as for example, polypropylene jars or Teflon® lined or stainless steel autoclaves. The crystallization is typically carried out at a temperature of about 100° C. to about 200° C., such as about 150° C. to about 170° C., for a time sufficient for crystallization to occur at the temperature used, e.g., from about 1 day to about 100 days, in particular from 1 to 50 days, for example from about 2 days to about 40 days. Thereafter, the synthesized crystals are separated from the mother liquor and recovered.

Since the as-synthesized crystalline zeolite contains the structure directing agent within its pore structure, the product is typically activated before use in such a manner that the organic part of the structure directing agent is at least partially removed from the zeolite. The activation process is typically accomplished by calcining, more particularly by heating the zeolite at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 400 to 600° C., for instance from 500 to 550° C., in the presence of an oxygen-containing gas, for example in air.

The synthetic zeolite of the present invention or manufactured by the process of the present invention may be used as an adsorbent or as a catalyst to catalyze a wide variety of organic compound conversion processes including many of present commercial/industrial importance. Examples of preferred chemical conversion processes which can be effectively catalyzed by the zeolite of the present invention or manufactured by the process of the present invention, by itself or in combination with one or more other catalytically active substances including other crystalline catalysts, include those requiring a catalyst with acid activity or hydrogenation activity. Examples of organic conversion processes which may be catalyzed by zeolite of the present invention or manufactured by the process of the present invention include cracking, hydrocracking, isomerization, polymerization, reforming, hydrogenation, dehydrogenation, dewaxing, hydrodewaxing, adsorption, alkylation, transalkylation, dealkylation, hydrodecylization, disproportionation, oligomerization, dehydrocyclization and combinations thereof. Hydrogenation and dehydrogenation are preferred processes. The conversion of hydrocarbon feeds can take place in any convenient mode, for example in fluidized bed, moving bed, or fixed bed reactors depending on the types of process desired.

The zeolite of the present disclosure, when employed either as an adsorbent or as a catalyst in an organic compound conversion process should be dehydrated, at least partially. This can be done by heating to a temperature in the range of about 100° C. to about 500° C., such as about 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the molecular sieve in a vacuum, but a longer time is required to obtain a sufficient amount of dehydration.

Once the zeolite has been synthesized, it can be formulated into a catalyst composition by combination with other materials, such as binders and/or matrix materials that provide additional hardness or catalytic activity to the finished catalyst. These other materials can be inert or catalytically active materials. The invention therefore provides a catalyst, for example a hydrogenation/dehydrogenation catalyst, which comprises the medium or large pore synthetic zeolite of the invention and at least 0.1 wt %, preferably from 1 to 90 wt %, based on the weight of the catalyst, of a binder. The relative proportions of zeolite and inorganic oxide matrix may vary widely, with the zeolite content ranging from about 1 to about 90 percent by weight and more usually, particularly when the catalyst is prepared in the form of beads, in the range of about 2 to about 80 weight percent of the catalyst.

In particular, it may be desirable to incorporate the zeolite of the present invention or manufactured by the process of the present invention with a binder that is resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon conversion processes. Thus the zeolites of the present invention or manufactured by the process of the present invention may be used in the form of an extrudate with a binder. They are typically bound by forming a pill, sphere, or extrudate. The extrudate is usually formed by extruding the zeolite, optionally in the presence of a binder, and drying and calcining the resulting extrudate.

Use of a material in conjunction with the zeolite of the present invention or manufactured by the process of the present invention, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions.

In addition to the foregoing materials, the zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

In certain embodiments the invention also provides:

Embodiment 1. A medium or large pore synthetic zeolite comprising the following:
  a. at least 0.02 wt %, based on the weight of the zeolite, of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, which is present as catalytic metal particles, wherein at least 60% by number of said catalytic metal particles have a particle size of 2.0 nm or less, and
  b. at least 0.005 wt %, based on the weight of the zeolite, of an alkali metal or alkaline earth metal selected from the group consisting of Li, Na, K, Cs, Ca, Mg, Ba and Sr and combinations thereof,
  wherein, if the zeolite comprises in the zeolite framework a trivalent element Y selected from the group consisting of Al, B, Ga Fe and combinations thereof, the $SiO_2:Y_2O_3$ ratio is greater than 200:1.

Embodiment 2. A medium or large pore synthetic zeolite as embodied in Embodiment 1, wherein at least 70% by number of said catalytic metal particles have a particle size of 2.0 nm or less.

Embodiment 3. A medium or large pore synthetic zeolite as embodied in Embodiments 1 or 2, which is a 10 or 12-membered ring zeolite.

Embodiment 4. A medium or large pore synthetic zeolite as embodied in any of Embodiments 1 to 3 which is a medium pore zeolite of framework type MFI, EUO, MTT, AFO, MEL, MFS, FER, TON or MWW; or is a large-pore zeolite of framework type FAU, BEA, BEC, MOR or LTL.

Embodiment 5. A medium or large pore synthetic zeolite as embodied in any of Embodiments 1 to 4 in which the catalytic metal is selected from the group consisting of Ru, Rh, Pd, Ag, Os, Ir, Pt, Au, Re, and combinations thereof.

Embodiment 6. A medium or large pore synthetic zeolite as embodied in any of Embodiments 1 to 5 in which the catalytic metal is Pt.

Embodiment 7. A medium or large pore synthetic zeolite as embodied in any of Embodiments 1 to 6 wherein the alkali metal or alkaline earth metal is present at 0.1 to 5.0 wt % based on the weight of the zeolite.

Embodiment 8. A medium or large pore synthetic zeolite as embodied in any of Embodiments 1 to 7 in which the alkali metal is Na or K.

Embodiment 9. A medium or large pore synthetic zeolite as embodied in any of Embodiments 1 to 8, wherein the molar ratio of the at least one catalytic metal to the at least one alkali metal or alkaline earth metal is in the range of from 0.2 to 10.

Embodiment 10. A medium or large pore synthetic zeolite as embodied in any of embodiments 1 to 9, which also comprises at least 0.01 wt % of an additional extra-framework metal selected from the group consisting of Ga, Zn, Sn, Fe, Ti, Zr, Nb, Hf, Ta, Mo and combinations thereof.

Embodiment 11. A medium or large pore synthetic zeolite as claimed in embodiment 10 which comprises Sn as additional extra-framework metal.

Embodiment 12. A medium or large pore synthetic zeolite as embodied in any of Embodiments 1 to 11, which is in as-synthesized form and further comprises a structure-directing agent (SDA), in particular an organic structure directing agent (OSDA).

Embodiment 13. A synthetic zeolite as embodied in any of Embodiments 1 to 12 in calcined form prepared by subjecting the zeolite to a calcining step.

Embodiment 14. A hydrogenation/dehydrogenation catalyst comprising the medium or large pore synthetic zeolite of any of Embodiments 1 to 13 and at least 0.1 wt %, based on the weight of the catalyst, of a binder.

Embodiment 15. A process for the preparation of a medium or large pore synthetic zeolite comprising:
  a. providing a synthesis mixture capable of forming the medium or large pore synthetic zeolite framework, the synthesis mixture comprising at least a source of Si, at least one catalytic metal precursor comprising a source of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, and a source of at least one alkali metal or alkaline earth metal selected from the group consisting of Li, Na, K, Cs, Ca, Mg, Ba, Sr and combinations thereof, and wherein, if a trivalent metal element Y selected from Al, B, Ga, Fe and combinations thereof is present, the $SiO_2:Y_2O_3$ ratio is greater than 200:1,
  b. heating said synthesis mixture under crystallization conditions to form crystals of said synthetic zeolite, and
  c. recovering said crystals of the medium or large pore synthetic zeolite from the synthesis mixture.

Embodiment 16. A process according to Embodiment 15, wherein the synthesis mixture has a molar ratio of $SiO_2:Y_2O_3$ from of greater than 500:1.

Embodiment 17. A process according to any of Embodiments 15 or 16 wherein the synthesis mixture also comprises a source of hydroxide ions and/or fluoride ions, a source of organic SDA and water.

Embodiment 18. A process according to any of Embodiments 15 to 17 wherein the at least one catalytic metal precursor includes metal complexes stabilized by ligands selected from the group consisting of N-containing ligands, 0-containing ligands, S-containing ligands and P-containing ligands.

Embodiment 19. A process according to any of Embodiments 15 to 18 wherein the synthesis mixture comprises an organic structure directing which is a quaternary ammonium cation.

Embodiment 20. A process according to any of Embodiments 15 to 19 in which the crystals of medium or large pore synthetic zeolite recovered in step c. are crystals of a medium or large pore synthetic zeolite as embodied in any of Embodiments 1 to 11.

Embodiment 21. Use of the medium or large pore synthetic zeolite of any of Embodiments 1 to 13 as a sorbent or catalyst.

Embodiment 22. A process for converting a feedstock comprising an organic compound to a conversion product which comprises the step of contacting said feedstock with a catalyst comprising a synthetic zeolite as embodied in any of Embodiments 1 to 13.

Embodiment 23. A process as embodied in Embodiment 22 which is a hydrogenation or dehydrogenation process.

Embodiment 24. A process as embodied in Embodiment 22 which is a hydroprocessing process.

Embodiment 25. A process as embodied in Embodiment 22 which is a catalytic reforming process.

EXAMPLES

Comparative Example 1. Synthesis of Pt@MFI Material (Pt Nanoparticles Encapsulated in Purely Siliceous MFI)

Figure 2:
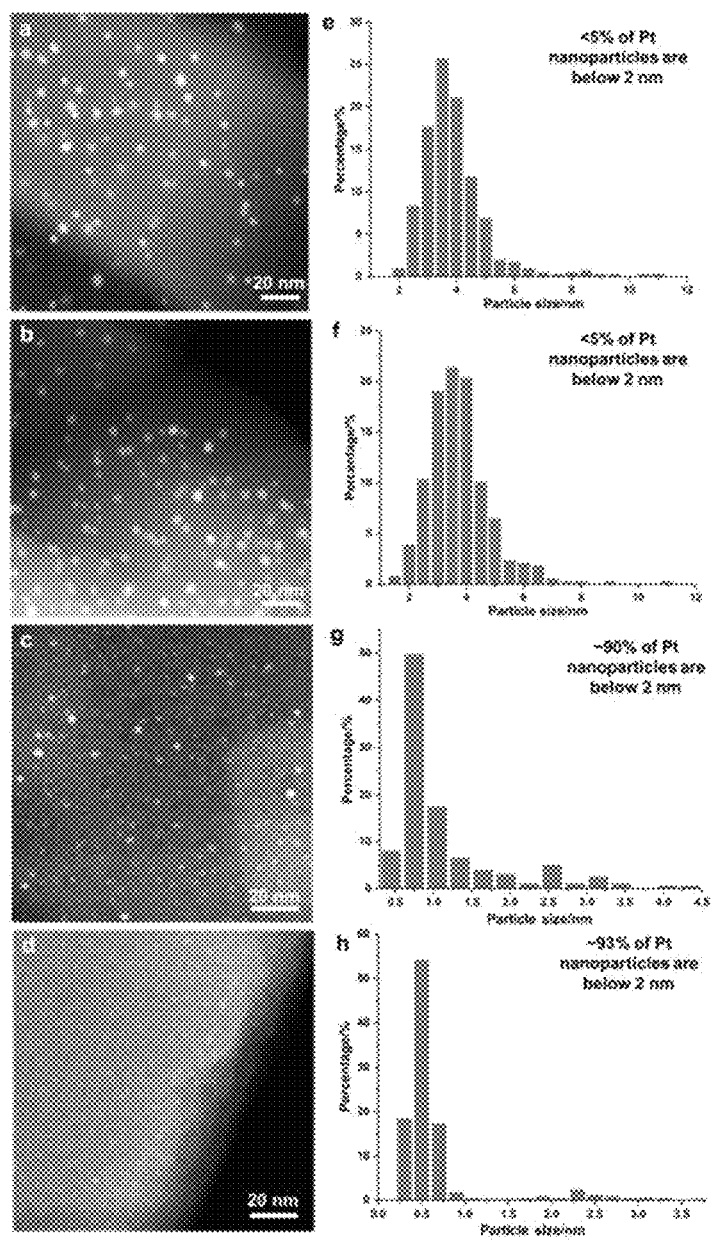
FIG. 2 shows STEM images and corresponding particle size distributions of Pt-zeolite materials from Example 1 to 4. (a, e) Pt@MFI, (b, f) PtSn@MFI, (c, g) K—Pt@MFI and (d, h) K—PtSn@MFI.

Pt nanoparticles encapsulated in MFI zeolite were prepared by a one-pot synthesis. Firstly, a tetrapropylammonium hydroxide (TPAOH) solution was prepared by mixing 8.12 g of K-free TPAOH solution (40 wt %, from Alfa-Aesar (product code: 17456.22) and 20.1 g of distilled water at room temperature. Then, 8.24 g tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 µL $H_2PtCl_6$ aqueous (0.38 mol/L) and 150 µL of ethylenediamine were added to the above solution and the mixed solution was kept stirring for 20 min. The resultant yellow solution was then transferred to Teflon-lined autoclaves and heated in an electric oven at 175° C. for 96 h under static conditions. The amount of Pt in the final product is 1.4 wt %. After the hydrothermal process, the solid product was isolated by filtration and washed with distilled water and acetone and then dried at 60° C. Then the solid sample was calcined in flow air at 560° C. for 8 h to produce a K-free Pt@MFI sample. SEM (FIG. 2) showed that less than 5% of metal particles were smaller than 2 nm.

Comparative Example 2. Synthesis of PtSn@MFI Material

Bimetallic PtSn clusters encapsulated in MFI zeolite were prepared by a one-pot synthesis. Firstly, a tetrapropylammonium hydroxide (TPAOH) solution was prepared by mixing 8.12 g of K-free TPAOH (40 wt %, from Alfa-Aesar, product code: 17456.22) and 20.1 g of distilled water at room temperature. Then, 8.24 g Tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 µL of $H_2PtCl_6$ aqueous (0.38 mol/L), 24 mg of $SnCl_4 \cdot 5H_2O$ and 150 µL of ethylenediamine were added to the above solution and the mixed solution was kept stirring for 20 min. The resultant yellow solution was then transferred to Teflon-lined autoclaves and heated in an electric oven at 175° C. for 96 h under static conditions. The amount of Pt in the final product was 1.37 wt % and the amount of Sn in the final product was 0.73 wt %. After the hydrothermal process, the solid product was isolated by filtration and washed with distilled water and acetone and then dried at 60° C. Then the solid sample was calcined in flow air at 560° C. for 8 h to produce a K-free PtSn@MFT sample. SEM (FIG. 2) showed that less than 5% of metal particles were smaller than 2 nm.

Example 3. Synthesis of K-Promoted Pt@MFI (Pt Clusters Encapsulated in Purely Siliceous MFI)

K-promoted Pt clusters encapsulated in MFI zeolite were prepared by a one-pot synthesis. Firstly, a tetrapropylammonium hydroxide (TPAOH) solution was prepared by mixing 5.0 g of K-free TPAOH solution (40 wt %, from Alfa-Aesar, product code: 17456.22) and 6.24 g of TPAOH solution (20 wt %, from Sigma-Aldrich containing ~0.6 wt % of K, product code: 254533-100G) and 17.0 g of distilled water at room temperature. Then, 8.24 g Tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 µL of $H_2PtCl_6$ aqueous (0.38 mol/L) and 150 µL of ethylenediamine were added to the above solution and the mixed solution was kept stirring for 20 min. The resultant yellow solution was then transferred to Teflon-lined autoclaves and heated in an electric oven at 175° C. for 96 h under static conditions. The amount of Pt and K in the final product was 1.43 wt % and 0.7 wt %. After the hydrothermal process, the solid product was isolated by filtration and washed with distilled water and acetone and then dried at 60° C. Then the solid sample was calcined in flow air at 560° C. for 8 h. The $SiO_2:Y_2O_3$ ratio of the solid zeolite was greater than 200. SEM (FIG. 2) showed that about 90% of metal particles were smaller than 2 nm.

Example 4. Synthesis of K-Promoted PtSn@MFI (PtSn Bimetallic Clusters Encapsulated in Purely Siliceous MFI)

K-promoted PtSn bimetallic clusters encapsulated in MFI zeolite were prepared by a one-pot synthesis. Firstly, a tetrapropylammonium hydroxide (TPAOH) solution was prepared by mixing 5.0 g K-free TPAOH solution (40 wt %, from Alfa-Aesar without K, product code: 17456.22) and 6.24 g TPAOH (20 wt % from Sigma-Aldrich containing ~0.6 wt % of K, product code: 254533-100G) and 17.0 g of distilled water at room temperature. Then, 8.24 g Tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 µL of $H_2PtCl_6$ aqueous (0.38 mol/L), 40 mg of $SnCl_4 \cdot 5H_2O$ and 150 µL of ethylenediamine were added to the above solution and the mixed solution was kept stirring for 20 min. The resultant yellow solution was then transferred to Teflon-lined autoclaves and heated in an electric oven at 175° C. for 96 h under static conditions. The amount of Pt, Sn and K in the final product was 1.48 wt %, 0.62 wt % and 0.64 wt %. After the hydrothermal process, the solid product was isolated by filtration and washed with distilled water and acetone and then dried at 60° C. Then the solid sample was calcined in flow air at 560° C. for 8 h. The $SiO_2:Y_2O_3$ ratio of the solid zeolite was greater than 200. SEM (FIG. 2) showed that about 93% of metal particles were smaller than 2 nm.

TABLE 1

Chemical compositions of the Pt-zeolite samples from Examples 1 to 4.

| Sample | Pt (wt. %) | Sn (wt. %) | K (wt. %) |
|---|---|---|---|
| Pt @ MFI | 1.40 | — | — |
| PtSn @ MFI | 1.37 | 0.73 | — |
| K—Pt @ MFI | 1.43 | — | 0.7 |
| K—PtSn @ MFI | 1.48 | 0.62 | 0.64 |

TABLE 2

Fitting results of the Pt-edge X-ray absorption spectra of different Pt-zeolite samples.[a]

| Sample | $N_{Pt-Pt}$ | $R_{Pt-Pt}$ (Å) | $\sigma^2$ (Å$^2$) | $\Delta E_0$ (eV) | $R_{factor}$ |
|---|---|---|---|---|---|
| Pt foil | 12 | 2.764 ± 0.002 | 0.0050 ± 0.0003 | 7.6 ± 0.8 | 0.0024 |
| Pt @ MFI[a] | 11.0 ± 0.4 | 2.760 ± 0.001 | 0.0050 ± 0.0002 | 6.8 ± 0.3 | 0.0018 |
| PtSn @ MFI[a] | 10.0 ± 0.3 | 2.758 ± 0.001 | 0.0051 ± 0.0001 | | 0.0018 |
| K—Pt @ MFI[a] | 7.4 ± 0.4 | 2.754 ± 0.002 | 0.0057 ± 0.0002 | | 0.0022 |
| K—PtSn @ MFI[a] | 7.1 ± 0.2 | 2.762 ± 0.001 | 0.0052 ± 0.0001 | | 0.0016 |
| K—PtSn @ MFI-AR[a] | 6.9 ± 0.2 | 2.761 ± 0.001 | 0.0051 ± 0.0001 | | 0.0018 |

[a]The samples were in situ reduced by H$_2$ at 600° C. and then cooled down to room temperature before recording the XAS spectra. The fits were performed on the first coordination shell ($\Delta R$ = 2.0-3.0 Å) over FT of the k$^1$k$^2$k$^3$-weighted $\chi$(k) functions performed in the $\Delta$k = 3.6-16.7 Å$^{-1}$ interval, resulting into a number of independent parameters of 2$\Delta$R$\Delta$k/$\pi$ = 23.8 (7.9 for Pt foil). The standard Pt foil was fitted individually while the three samples were fitted using a corefinement approach resulting into one $N_{Pt-Pt}$, R and $\sigma^2$ for each sample and one $\Delta E_0$ common for all samples. Non optimized parameters are recognizable by the absence of the corresponding error bar. $S_0^2$ = 0.95.

TABLE 3

Fitting results of the Sn-edge X-ray absorption spectra of different Pt-zeolite samples.[b]

| Sample | $N_{Sn-O}$ | $R_{Sn-O}$ (Å) | $\sigma^2$ (Å$^2$) | $\Delta E_0$ (eV) | $R_{factor}$ |
|---|---|---|---|---|---|
| SnO$_2$ | 6 | 2.055 ± 0.010 | 0.0023 ± 0.0012 | 7.3 ± 1.4 | 0.0044 |
| SnO | 4 | 2.202 ± 0.001 | 0.0071 ± 0.0012 | 8.3 ± 0.7 | 0.0017 |
| K—PtSn @ MFI[b] | 2.8 ± 0.2 | 2.052 ± 0.006 | 0.0054 ± 0.0012 | 8.4 ± 0.6 | 0.0035 |
| K—PtSn @ MFI-AR[b] | 3.9 ± 0.2 | 2.028 ± 0.001 | 0.0041 ± 0.0008 | 7.7 ± 0.4 | 0.0018 |

[b]The fits were performed on the first coordination shell ($\Delta R$ = 1.0-2.0 Å) over FT of the k$^1$k$^2$k$^3$-weighted $\chi$(k) functions performed in the $\Delta$k = 2.8-11.0 Å$^{-1}$ interval, resulting into a number of independent parameters of 2$\Delta$R$\Delta$k/$\pi$ = 15.3 for each data set of the three samples before and after reduction (5 for both SnO$_2$ and SnO). The standards SnO$_2$ and SnO were fitted individually while the three samples were fitted using a corefinement approach resulting into one $N_{Sn-O}$, $R_{Sn-O}$, $\sigma^2$ per sample and one $\Delta E_0$ for each series (fresh and the in situ reduced ones). Non optimized parameters are recognizable by the absence of the corresponding error bar. SnO$_2$ $S_0^2$ = 0.89; SnO $S_0^2$ = 1.0.

Figure 3:
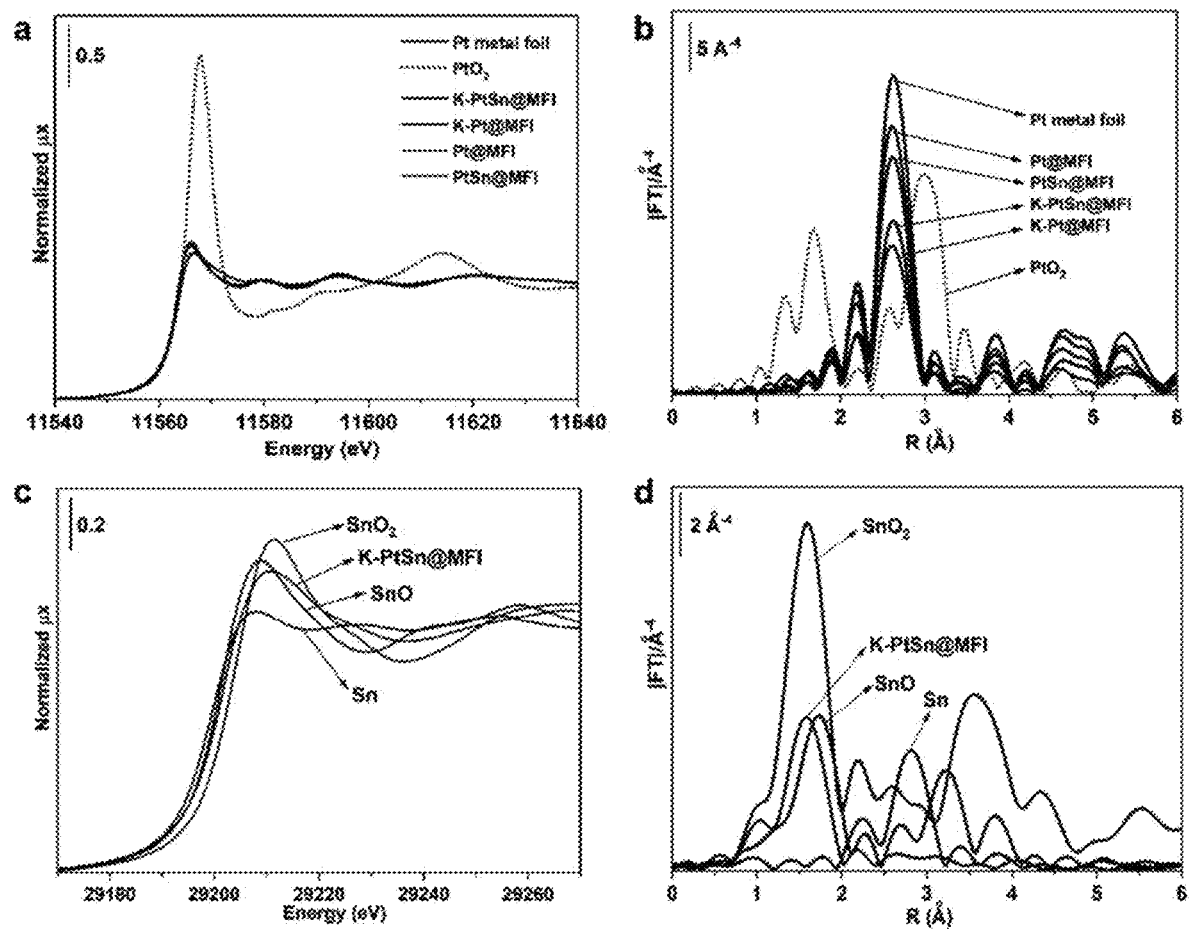
FIG. 3(a) shows XANES spectra of Pt-zeolite samples from Examples 1 to 4, which were reduced by $H_2$ at 600° C. before acquiring the spectra. The Pt and $PtO_2$ reference samples were measured directly.
FIG. 3(b) shows Pt $L_3$-edge EXAFS spectra of Pt-zeolite samples from Examples 1 to 4 and reference samples.
FIG. 3(c) shows XANES spectra of K—PtSn@MFI sample after in situ reduction by $H_2$ at 600° C. together with reference samples which were measured directly.
FIG. 3(d) shows Sn K-edge EXAFS spectra of K—PtSn@MFI sample and some reference samples.
Figure 4:
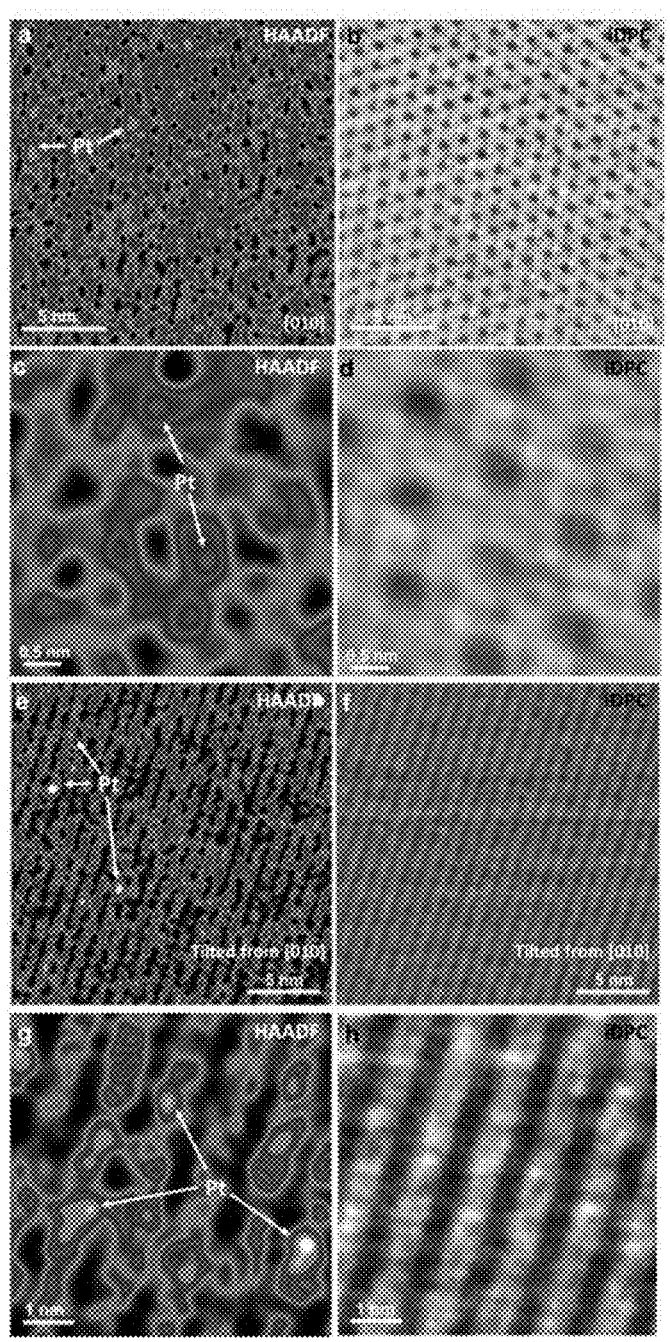
FIGS. 4(a)-4(d) show high-resolution STEM images of K—PtSn@MFI zeolite, comprising STEM-HAADF images and the corresponding iDPC images in the same area of K—PtSn@MFI sample in the [010] orientation.
FIGS. 4(e)-4(h) show STEM-HAADF images and the corresponding iDPC images in the same area of K—PtSn@MFI sample in the tilted-[010] orientation. In the HAADF images, subnanometric Pt clusters (~0.5 nm) are clearly imaged. In the corresponding iDPC image, the atomic structures of MFI zeolite are also clearly imaged. By combining the images obtained in the two models, the precise location of Pt species in the MFI zeolite can be identified, which is the sinusoidal channels.

To elucidate the chemical states and coordination environment of Pt and Sn in the abovementioned samples, both X-ray absorption near-edge structure (XANES) and extended X-ray adsorption fine structure (EXAFS) have been recorded after in situ reduction by H$_2$ at 600° C. It was found by analyzing Pt L$_{III}$-edge XANES results of as-reduced samples (FIG. 3a) that the spectra of the Pt-zeolite samples are quite similar to Pt foil, albeit with different intensities of oscillations, which is related to the well-known finite size effect present in XAS spectra of metal nanoparticles. Also, it is not possible to identify any Pt—Sn interaction on Pt edge since there are no phase-shifts in either k-space (not shown) or |FT| with respect to Pt foil (FIG. 3b). As can be seen in Table 1, the coordination numbers of Pt—Pt first shell ($N_{Pt-Pt}$) for Pt@MFI and PtSn@MFI sample are 10 and 11 respectively, corresponding to a particle size of 4-5 nm, as observed in the STEM images. In the case of K-containing samples, $N_{Pt-Pt}$ of ~7 corresponds to a Pt particle size of ~1 nm. [de Graaf, J., van Dillen, A. J., de Jong, K. P. & Koningsberger, D. C. Preparation of Highly Dispersed Pt Particles in Zeolite Y with a Narrow Particle Size Distribution: Characterization by Hydrogen Chemisorption, TEM, EXAFS Spectroscopy, and Particle Modeling. J. Catal. 203, 307-321 (2001).] It should be noted that, since EXAFS is an average technique, the presence of a small amount of Pt nanoparticles (>2 nm) on the surface of MFI zeolite crystallites could increase the expected average coordination number in the case of a highly clustered system. Therefore, by combining the STEM images and EXAFS results, it may be possible to estimate the distributions of Pt species in the whole K—PtSn@MFI sample. Given that the average size of Pt clusters in the internal space of MFI zeolite is ~0.55 nm while the average size of Pt nanoparticles on the surface is ~2.5 nm, then >70% of Pt atoms should be located in the internal space of MFI zeolite crystallites as subnanometric clusters while <30% of Pt atoms exist as Pt nanoparticles (according to the following simple estimation: 70%×0.55+30%×2.5≈1.1 nm). In the case of K—Pt@MFI, the percentage of Pt nanoparticles is slightly higher, resulting in a higher Pt—Pt coordination number and larger average particle size.

Furthermore, the Sn edge of the K—PtSn@MFI sample has also been studied for both the unreduced sample and the sample reduced by H$_2$ at 600° C. By comparing the shape and position of absorption edge in the XANES spectra (see FIG. 3c) to those of SnO and SnO$_2$ standard, it is clear that the oxidation state of Sn in the unreduced K—PtSn@MFIs sample is Sn(IV). The |FT| of the unreduced sample (FIG. 3d) presents essentially one peak centered at 1.5 Å (not phase-corrected), related to Sn—O contribution, which is slightly shifted to shorter distances respect to SnO$_2$ standard. Also, higher shells are almost absent which points out that the Sn species exist in an amorphous (disordered) or highly dispersed form within the MFI zeolite. During the reduction process by H$_2$, a decrease in the white line intensity and a redshift of spectra for both samples is observed when raising the temperature from room temperature to 600° C., suggesting the reduction of Sn species by H$_2$. As shown in FIG. 3c, although the edge position is the same in comparison with SnO, the shape of the XANES spectra does not resemble any spectra of Sn in reduced state (Sn metal or SnO), which indicates a possible formation of a SnO$_{4-x}$ phase. This can also be supported by the reduction in the first shell intensity of |FT| (FIG. 3d) from ~10 Å$^4$ for samples before reduction to ~4.5 Å$^{-4}$ for samples after reduction, which is related to loss of first neighbor ligands. The idea that Sn species are well-dispersed within the material is supported by |FT| of samples after reduction, since no additional higher shells are formed upon thermal treatment in H$_2$. It should be noted that the |FT| spectra observed with the K—PtSn@MFI sample is similar to Sn-Beta reported in the literature, which further confirms that SnOx species are mainly either interacting with the oxygen in the framework of the MFI zeolite or exist as highly dispersed Sn(IV) oxide species in zeolite crystallites. [Bare, S. R. et al. Uniform catalytic site in Sn-beta-zeolite determined using X-ray absorption fine structure. *J. Am. Chem. Soc.* 127, 12924-12932 (2005).][Hammond, C. et al. Identification of Active and Spectator Sn Sites in Sn-beta Following Solid-State Stannation, and Consequences for Lewis Acid Catalysis. *ChemCatChem* 7, 3322-3331 (2015).]

Herein, in order to identify the location of subnanometric Pt clusters in the K—PtSn@MFI sample (after having been reduced by H$_2$ at 600° C.), a combination of high-resolution high-angle annular dark field imaging (HAADF) and integrated differential phase contrast (iDPC) imaging techniques were employed to visualize both Pt clusters and the zeolite structures with atomic resolution. As displayed in FIG. 4a and FIG. 4c, Pt clusters of 0.4-0.7 nm can be clearly observed in the HAADF image along the [010] direction, and the 10-MR straight pores appear as low-contrast pores in the HAADF image. However, due to the weak contrast of the zeolite framework, the atomic structures of MFI zeolite are not visible in the HAADF image. With the newly developed iDPC technique, the atomic structure of MFI zeolite can be recorded simultaneously together with the HAADF image. As presented in FIG. 4b and FIG. 4d, the detailed structures of MFI zeolite can be clearly identified in the iDPC image, even the 5R units in the framework. Since HAADF imaging is more sensitive to heavy elements (Pt in this work), while the structural information of the zeolite framework is captured by iDPC imaging mode, the precise location of subnanometric Pt clusters can be identified by correlating the HAADF and iDPC imaging results, which indicates that Pt clusters are located in the sinusoidal channels. The location of Pt clusters have also been confirmed by the HAADF and iDPC imaging on a zeolite crystallite with a different orientation. As can be seen in FIG. 4e to FIG. 4h, it can be confirmed that subnanometric Pt clusters are located in the sinusoidal channels instead of intersectional void or straight channels of MFI zeolite. Based on the above imaging results, it can be seen that, HAADF-iDPC is a powerful tool to study the atomic structures of composite materials, especially for highly dispersed metal species supported on beam-sensitive materials.

REFERENCES FOR IDPC IMAGING TECHNIQUE

[1] E. Yucelen, I. Lazic and E. G. T. Bosch, *Scientific Reports*, 2018, 8, 2676.
[2] I. Lazic, E. G. T. Bosch and S. Lazar, *Ultramicroscopy*, 2016, 160, 265-280.
[3] I. Lazic, E. G. T. Bosch, S. Lazar, M. Wirix and E. Yücelen, *Microscopy and Microanalysis*, 2016, 22, 36-37.

Example 5. Synthesis of K-Promoted PtZn@MFI

K-promoted PtZn nanoparticles encapsulated in MFI zeolite were prepared by a one-pot synthesis. Firstly, a tetrapropylammonium hydroxide (TPAOH) solution was prepared by mixing 5.0 g TPAOH (40%, from Alfa-Aesar) and 6.24 g TPAOH (20% from Sigma-Aldrich) and 17.0 g of distilled water at room temperature. Then, 8.24 g tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 μL of H$_2$PtCl$_6$ aqueous (0.38 mol/L) and 56 mg of Zn(NO$_3$)$_2$·6H$_2$O were added to the above solution and the mixed solution was kept stirring for 20 min. The resultant yellow solution was then transferred to Teflon-lined autoclaves and heated in an electric oven at 175° C. for 96 h under static conditions. After the hydrothermal process, the solid product was isolated by filtration and washed with distilled water and acetone and then dried at 60° C. Then the solid sample was calcined in flow air at 560° C. for 8 h. The SiO$_2$:Y$_2$O$_3$ ratio of the solid zeolite was greater than 200.

Example 6. Synthesis of K-Promoted PtGa@MFI

K-promoted PtGa nanoparticles encapsulated in MFI zeolite were prepared by a one-pot synthesis. Firstly, a tetrapropylammonium hydroxide (TPAOH) solution was prepared by mixing 5.0 g TPAOH (40%, from Alfa-Aesar) and 6.24 g TPAOH (20% from Sigma-Aldrich) and 17.0 g of distilled water at room temperature. Then, 8.24 g Tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 233 μL of H$_2$PtCl$_6$ aqueous (0.38 mol/L) and 50 mg of Ga(NO$_3$)$_3$·8H$_2$O were added to the above solution and the mixed solution was kept stirring for 20 min. The resultant yellow solution was then transferred to Teflon-lined autoclaves and heated in an electric oven at 175° C. for 96 h under static conditions. After the hydrothermal process, the solid product was isolated by filtration and washed with distilled water and acetone and then dried at 60° C. Then the solid sample was calcined in flow air at 560° C. for 8 h. The SiO$_2$:Y$_2$O$_3$ ratio of the solid zeolite was greater than 200. Structural Characterizations of Examples 5 and 6

Figure 5:
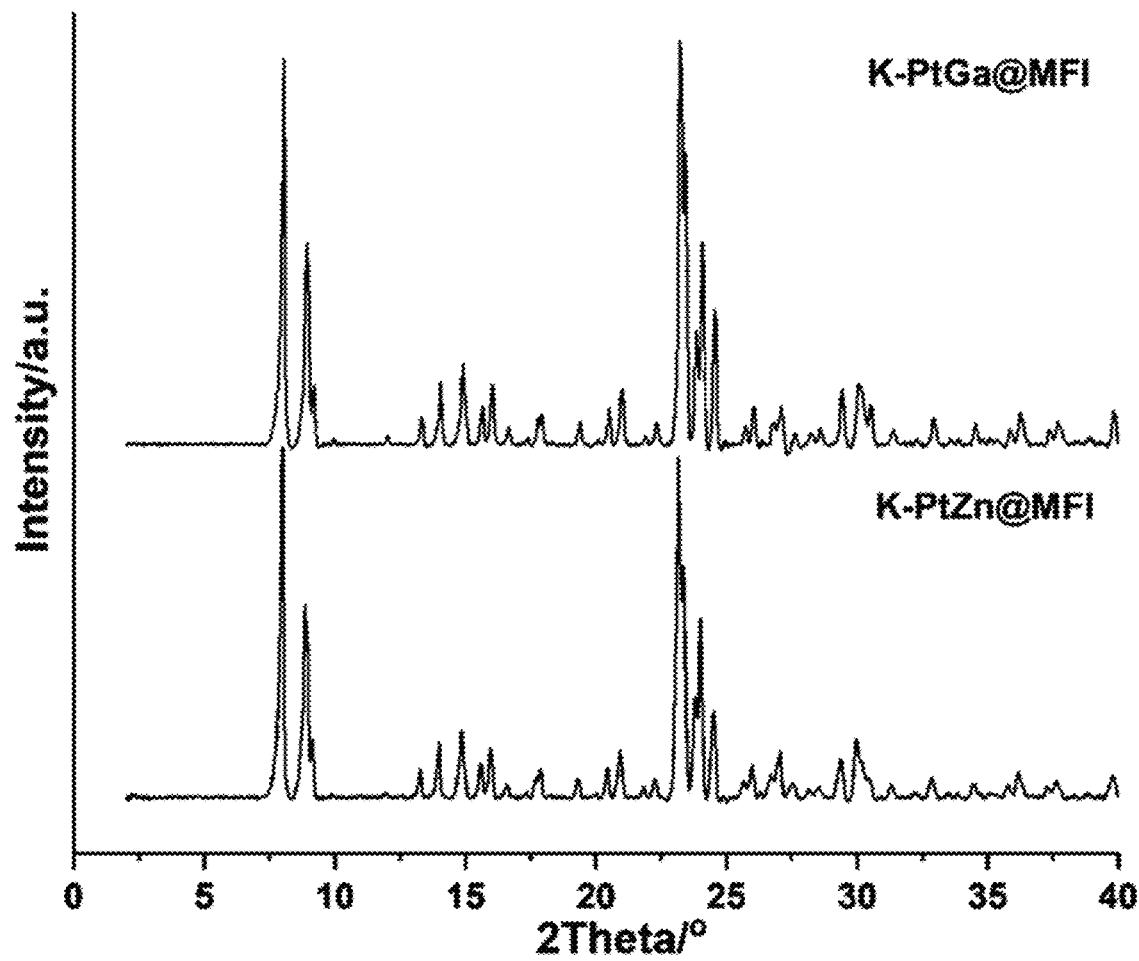
FIG. 5 shows XRD patterns of K—PtGa@MFI and K—PtZn@MFI samples of Examples 5 and 6.
Figure 6:
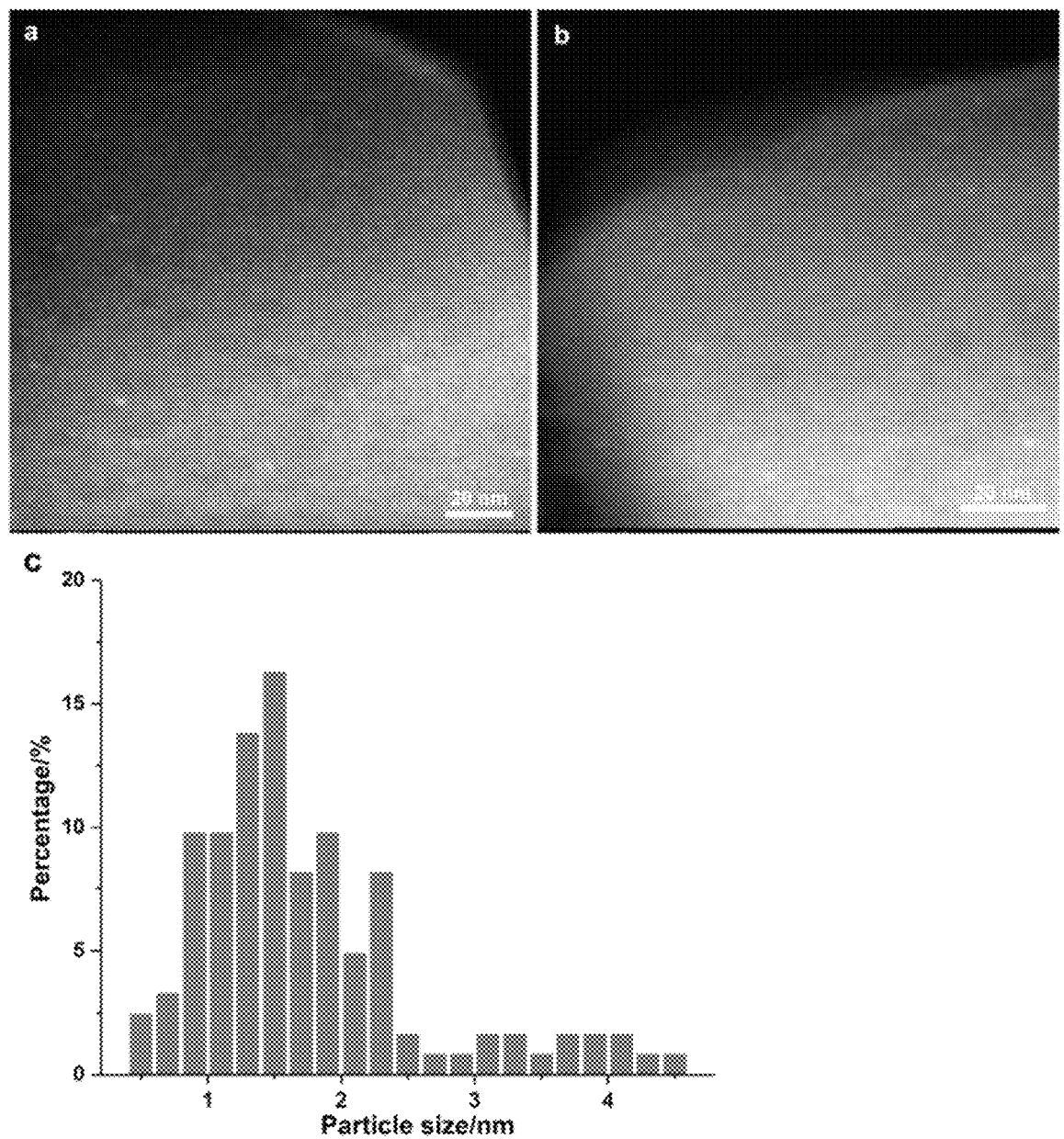
FIG. 6 shows STEM images of the K—PtZn@MFI sample of Example 5, showing the presence of subnanometric PtZn clusters and some PtZn nanoparticles (1-2 nm). The percentage of metal particles smaller than 2 nm is ~70% in this sample.
Figure 7:
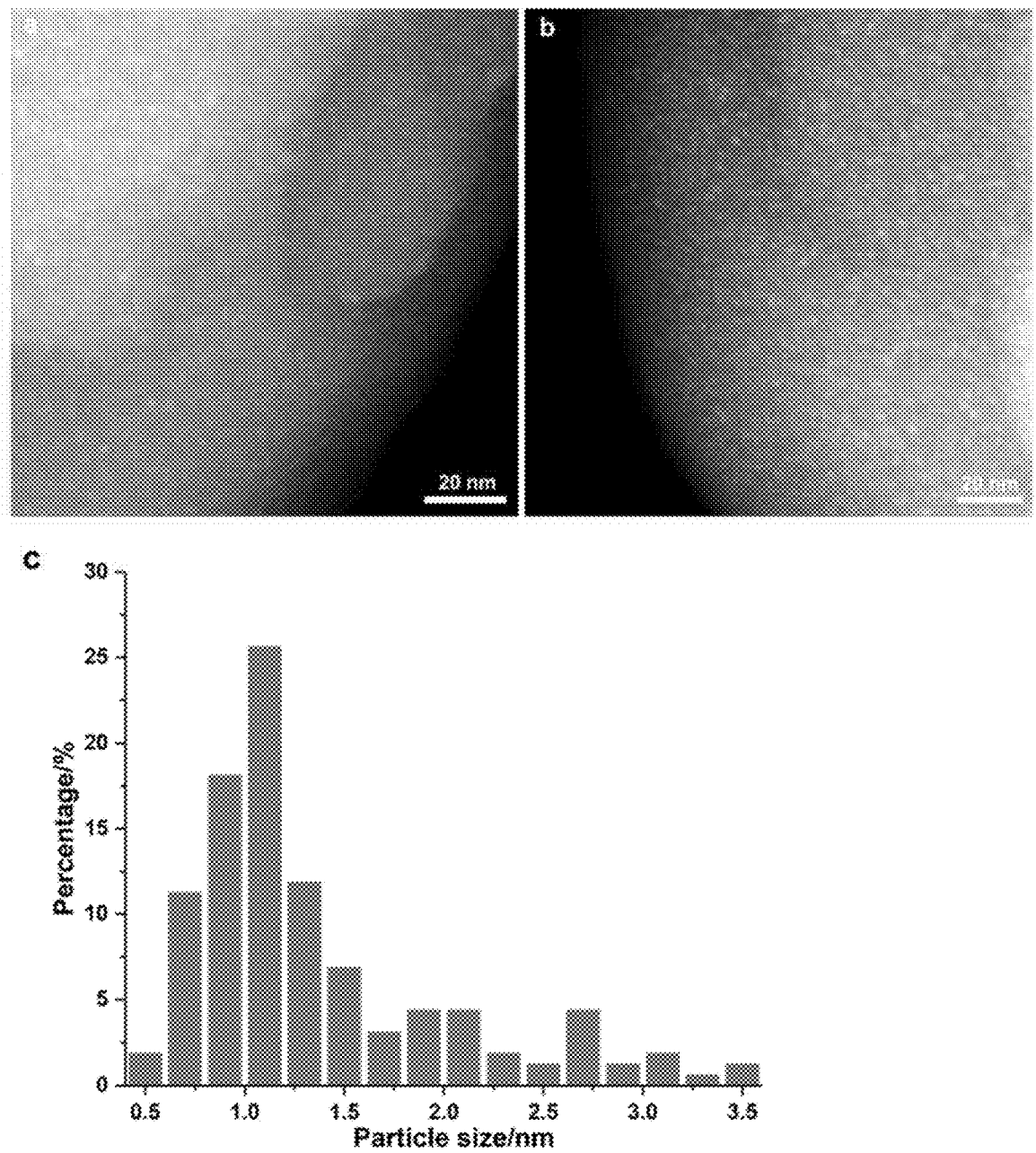
FIG. 7 shows STEM images of the K—PtGa@MFI sample of Example 6, showing the presence of subnanometric PtGa clusters and some PtGa nanoparticles. The percentage of metal particles smaller than 2 nm is ~80% in this sample.

XRD patterns of K—PtZn@MFI and K—PtGa@MFI samples are shown in FIG. 5, corresponding to a typical diffraction pattern of MFI zeolite. Furthermore, according the STEM images (see FIG. 6 and FIG. 7), subnanometric PtZn and PtGa clusters can be observed in these two samples respectively, suggesting that the method described above is a general method for the encapsulation of bimetallic Pt-based clusters in MFI zeolite.

TABLE 4

| Sample | Pt (wt. %) | Zn or Ga (wt. %) | K (wt. %) |
| --- | --- | --- | --- |
| K—PtZn @ MFI | 1.47 | 1.23 | 1.34 |
| K—PtGa @ MFI | 1.33 | 0.73 | 0.99 |

Chemical compositions of K—PtZn @ MFI and K—PtGa @ MFI prepared by one-pot synthesis. The amounts of metals in the two sample were measured by inductively coupled plasma (ICP).

Example 7: Na-Promoted Pt Clusters in Purely Siliceous MWW Zeolite

The one-pot synthesis strategy has also been applied to encapsulate subnanometric Pt clusters in purely siliceous MWW zeolite.

The synthesis procedure is as follows: 0.237 g NaCl was dissolved in 3.32 g of N,N,N-trimethyl-1-adamantanamonium hydroxide solution (0.8 M). Then, 1.33 g of hexamethyleneimine, 100 µL of $H_2PtCl_6$ aqueous (0.38 M) and 150 µL of ethylenediamine were added to this solution. The above solution was kept stirring at room temperature for 2-4 h. Then, 1.22 g of fumed silica (Aerosil 200, Degussa) was added under continuous stirring. After 2-4 h, the resultant suspension was transferred to a Teflon-lined stainless-steel autoclave and then heated at 150° C. rotated at 60 rpm for 144 h. After filtering, the white solid obtained was washed with distilled water until the pH was less than 9. After the hydrothermal process, the solid product was isolated by filtration and washed with distilled water and acetone and then dried at 60° C. Then the solid sample was calcined in flow air at 560° C. for 8 h. This was a pure silicaceous zeolite.

Figure 8:
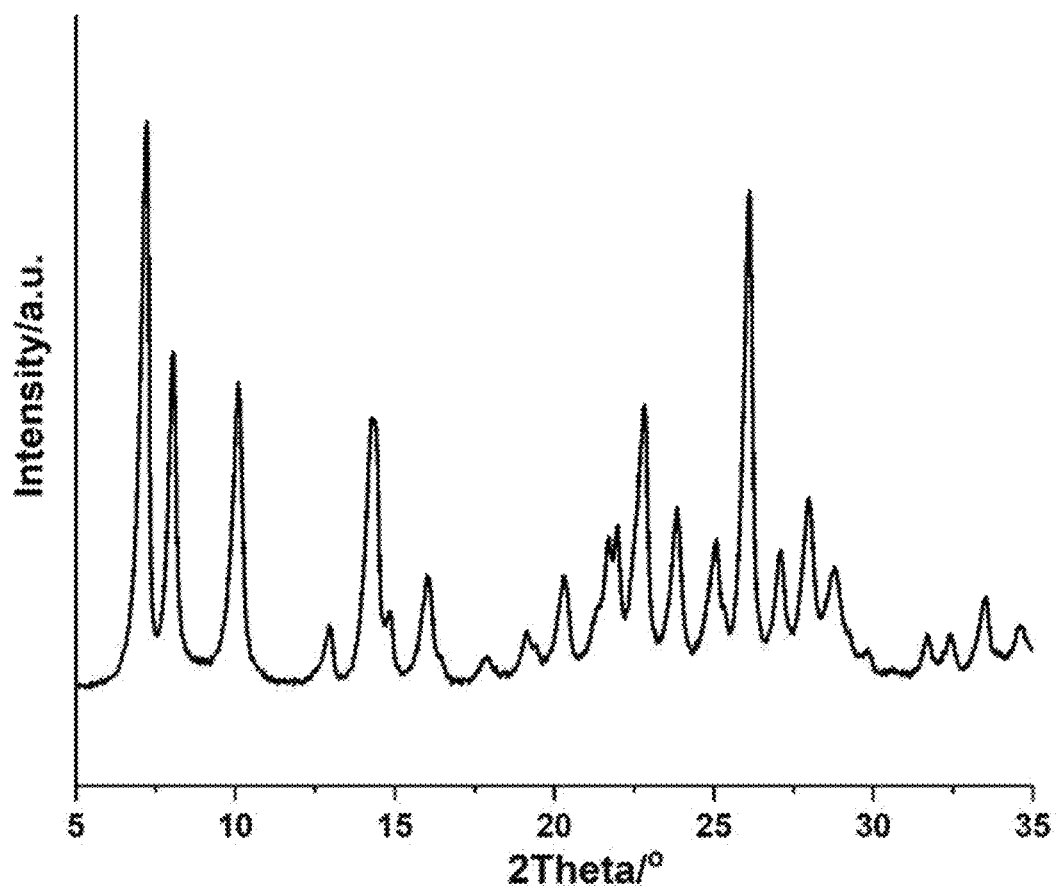
FIG. 8 shows an XRD pattern of a Na—Pt@MWW sample of Example 7.
Figure 9:
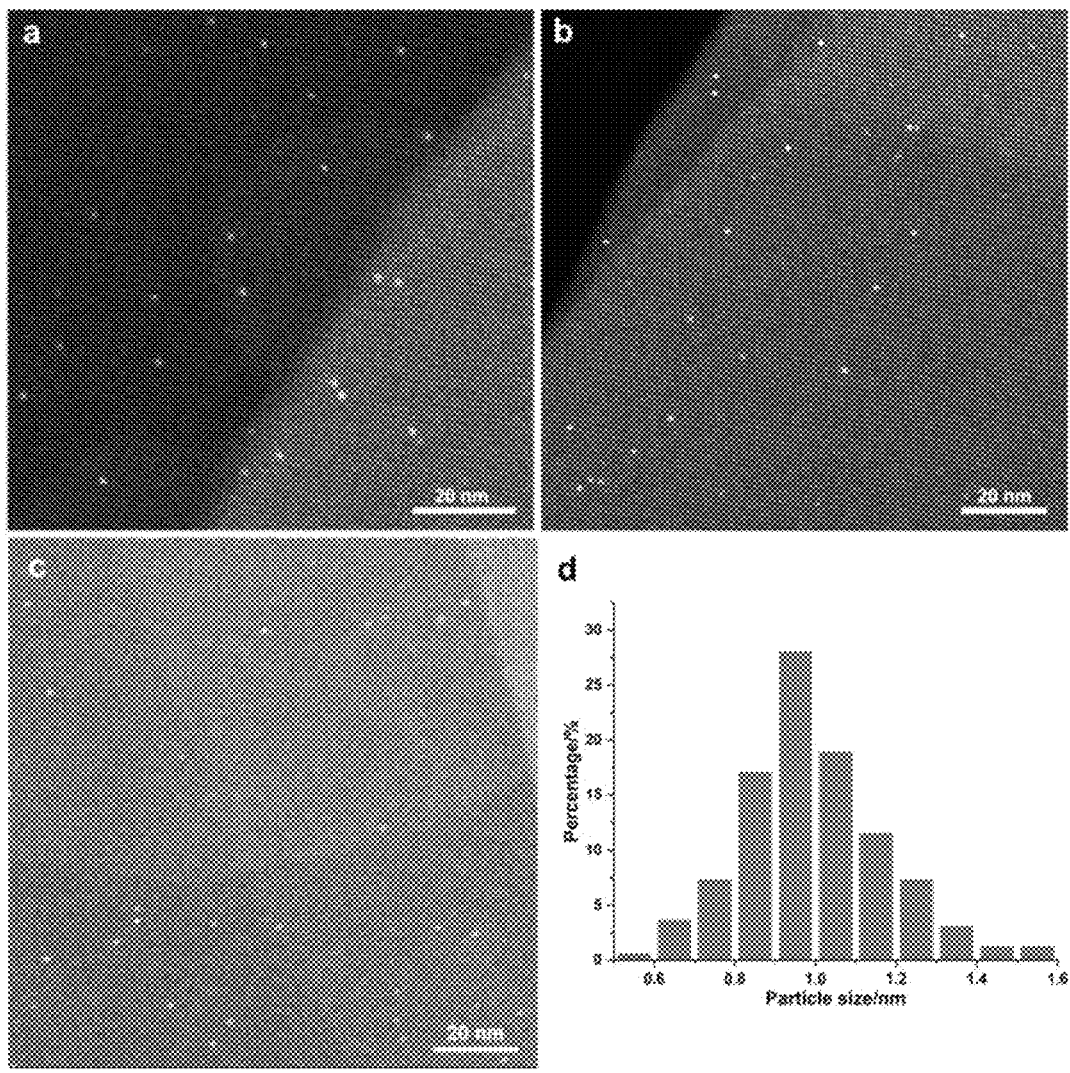
FIG. 9 shows STEM images of a Na—Pt@MWW sample of Example 7 after reduction by $H_2$ at 650° C., showing the presence of subnanometric Pt clusters (0.6-0.9 nm) dispersed in the purely siliceous MWW zeolite crystallites. The percentage of Pt nanoparticles smaller than 2 nm is >98%.

The XRD pattern and chemical composition of the as-prepared Na—Pt@MWW can be found in FIG. 8 and Table 5. The high stability of the Pt species in MWW zeolite has been confirmed by high-temperature reduction treatment by $H_2$. As shown in FIG. 9, subnanometric Pt species remain stable after reduction treatment at 650° C.

TABLE 5

| Sample | Pt (wt. %) | Na (wt. %) |
|---|---|---|
| Na—Pt @ MWW | 0.44 | 0.13 |

Chemical compositions of Na—Pt @ MWW prepared by one-pot synthesis in Example 7. The amounts of metals in the two sample were measured by inductively coupled plasma (ICP).

Figure 10:
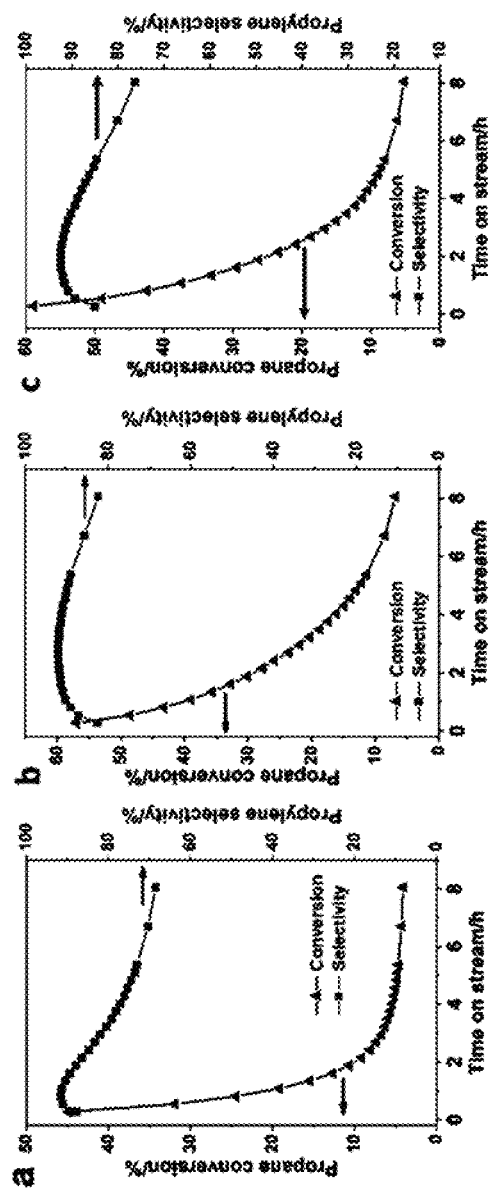
FIG. 10 shows the catalytic performance (conversion of propane and selectivity to propylene) of Pt@MFI catalyst (1.4 wt % of Pt) of Example 1 for propane dehydrogenation at 600° C. Reaction conditions: 100 mg Pt@MFI catalyst, propane/$N_2$ (5 mL propane and 16 mL $N_2$). The catalyst was reduced by $H_2$ at 600° C. before the atmosphere was switched to reaction feed gas. The deactivated catalyst was regenerated by calcination in air at 600° C. for 2 h and then reduced by $H_2$ at 600° C. for 1 h. (a) first cycle, (b) second cycle and (c) third cycle.
Figure 11:
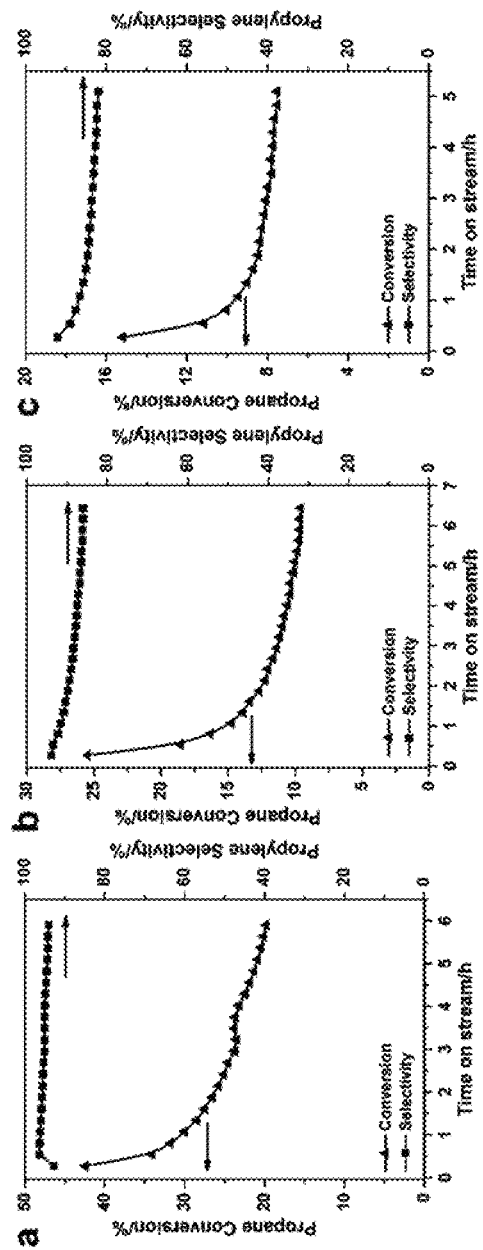
FIG. 11 shows the catalytic performance (conversion of propane and selectivity to propylene) of PtSn@MFI catalyst (1.37 wt % of Pt, 0.73 wt. % of Sn) of Example 2 for propane dehydrogenation at 600° C. Reaction conditions: 100 mg PtSn@MFI catalyst, propane/$N_2$ (5 mL propane and 16 mL $N_2$). The catalyst was reduced by $H_2$ at 600° C. before the atmosphere was switched to reaction feed gas. The deactivated catalyst was regenerated by calcination in air at 600° C. for 2 h and then reduced by $H_2$ at 600° C. for 1 h. (a) first cycle, (b) second cycle and (c) third cycle.
Figure 12:
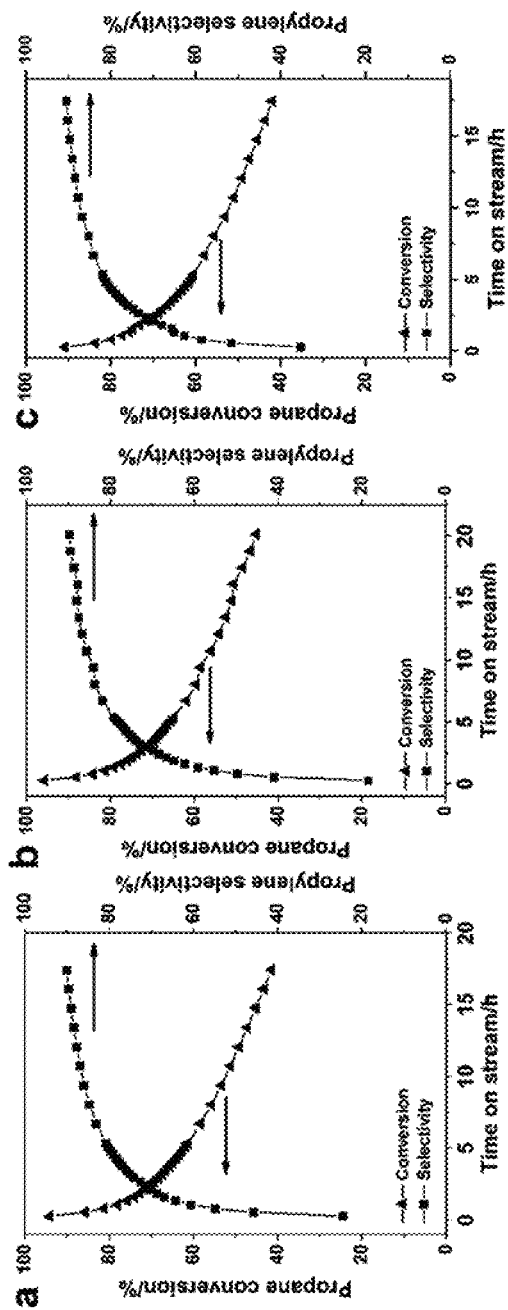
FIG. 12 shows the catalytic performance, conversion of propane (triangle) and selectivity to propylene (square), of the K—Pt@MFI catalyst (1.43 wt % of Pt and 0.7 wt % of K) of Example 3 for propane dehydrogenation at 600° C. Reaction conditions: 100 mg K—Pt@MFI catalyst, propane/$N_2$ (5 mL propane and 16 mL $N_2$). The catalyst was reduced by $H_2$ at 600° C. before the atmosphere was switched to reaction feed gas. The deactivated catalyst was regenerated by calcination in air at 600° C. for 2 h and then reduced by $H_2$ at 600° C. for 1 h. (a) first cycle and (b) second cycle and (c) third cycle.
Figure 14:
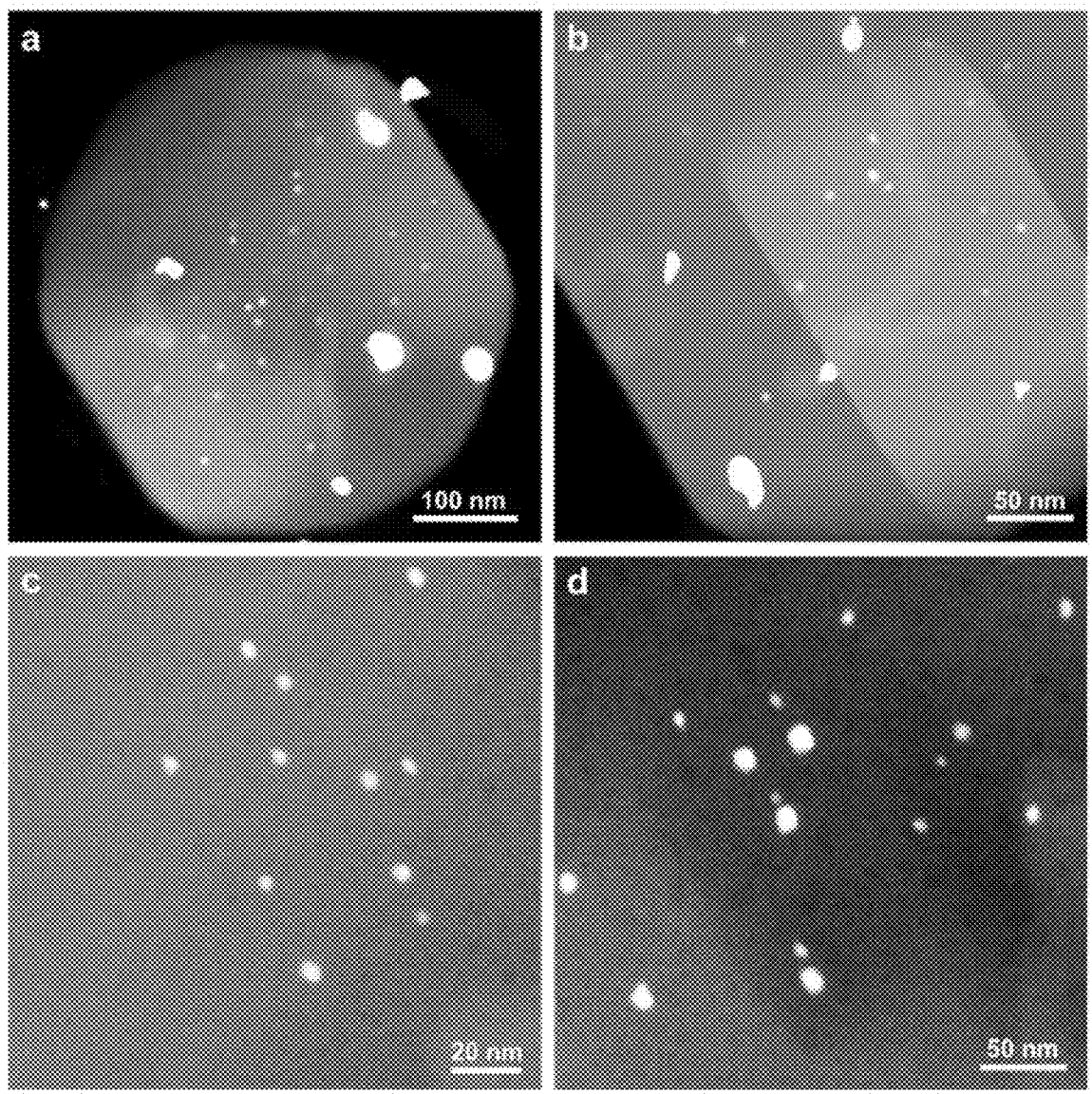
FIG. 14 shows STEM images of the Pt@MFI sample of Example 1 after three cycles of propane dehydrogenation. The agglomeration of Pt nanoparticles into larger ones can be seen in these images.
Figure 15:
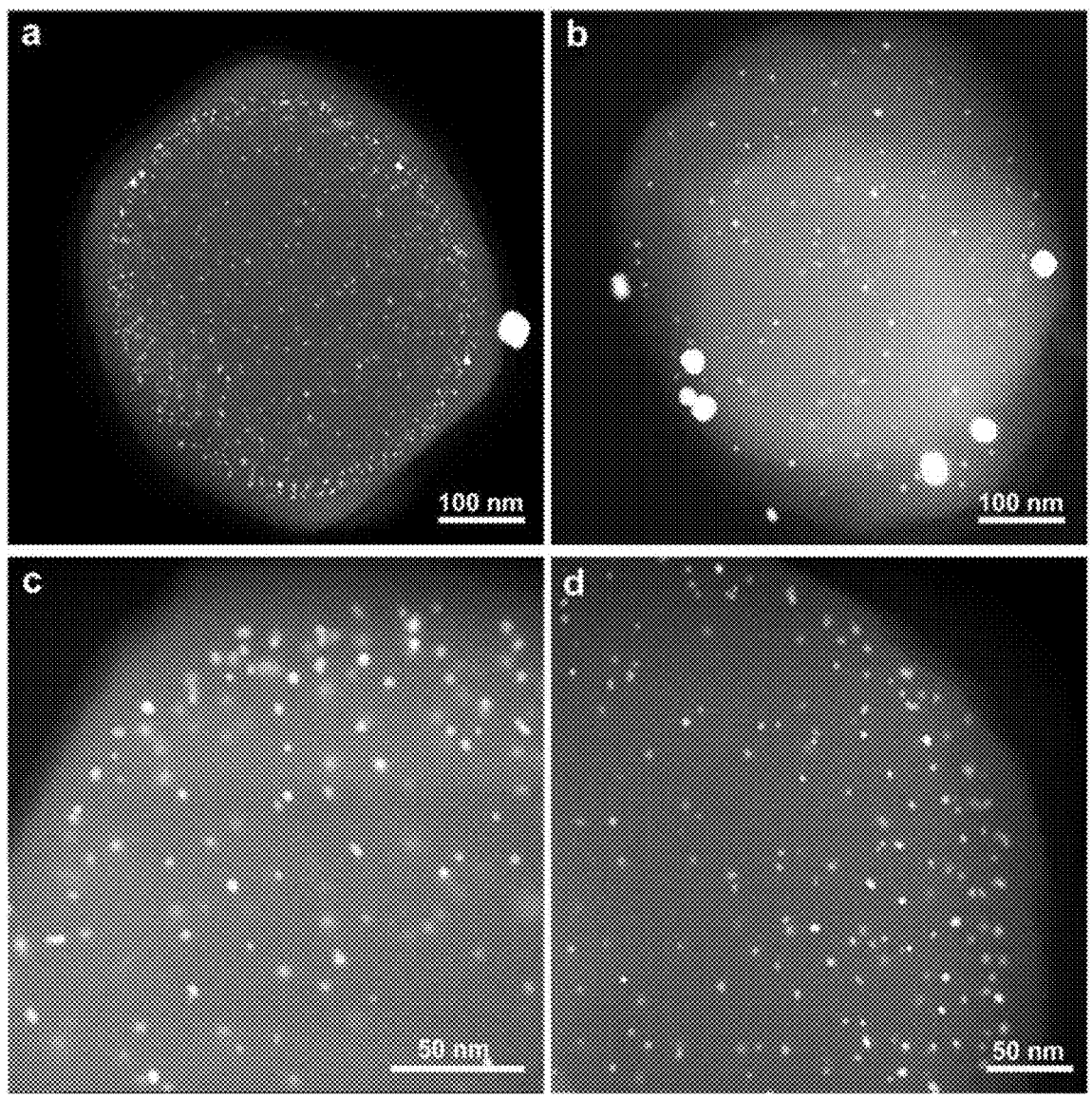
FIG. 15 shows STEM images of the PtSn@MFI sample of Example 2 after three cycles of propane dehydrogenation. The agglomeration of Pt nanoparticles into larger ones can be seen in these images.
Figure 16:
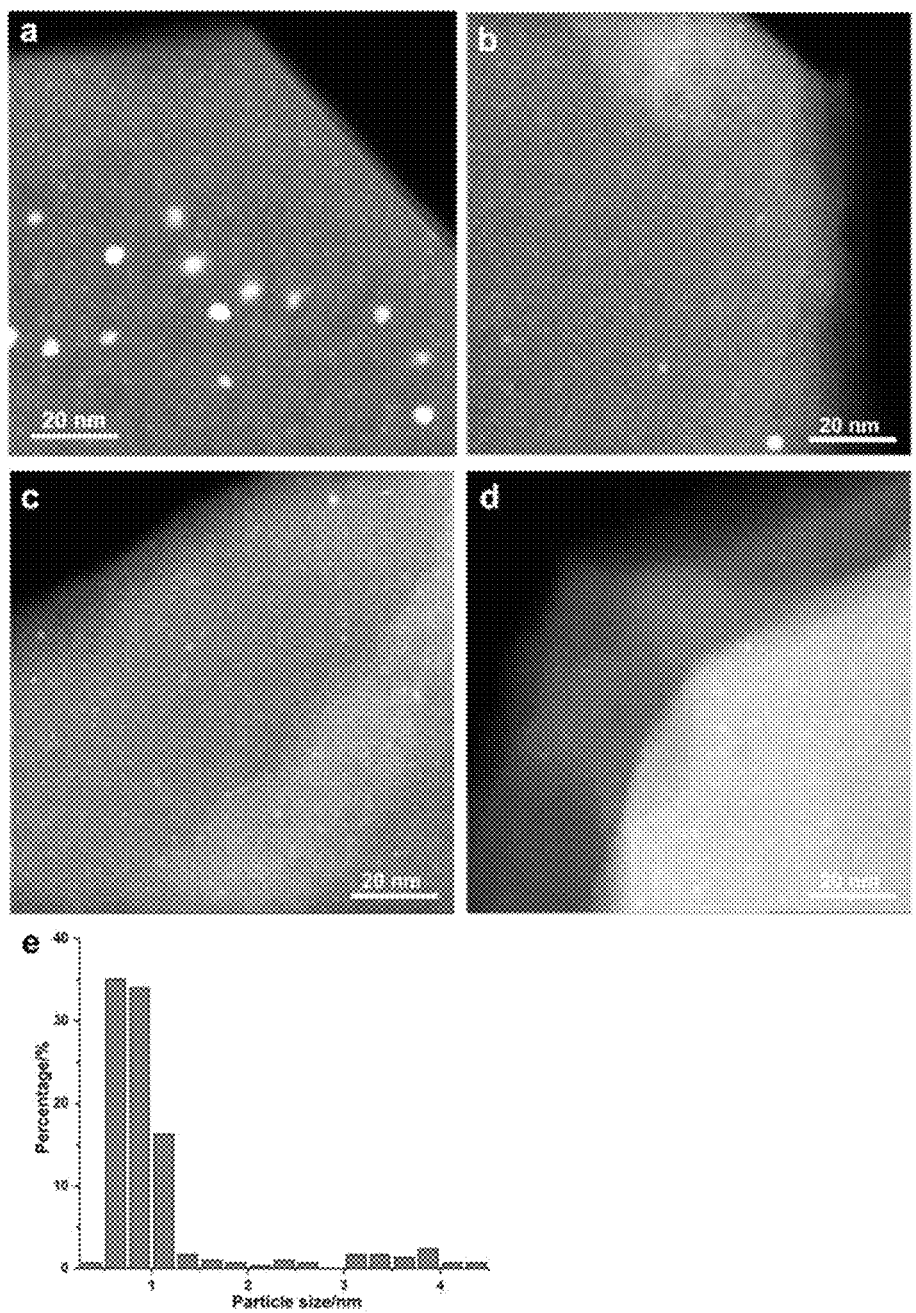
FIG. 16 shows STEM images of the K—Pt@MFI sample of Example 3 after three cycles of propane dehydrogenation reaction. A large number of subnanometric Pt clusters as well as some Pt nanoparticles are still present in the sample. About 90% of Pt particles are smaller than 2 nm in the K—Pt@MFI sample after three cycles of propane dehydrogenation reaction.

Example 8. Application of K-Promoted Pt@MFI and PtSn@MFI for Dehydrogenation of Propane The dehydrogenation of propane to propylene was chosen as model reaction to test the reactivity and stability of Pt particles or clusters encapsulated in pure-silica MFI zeolite. Firstly, the catalytic performance of Pt-zeolite samples with high Pt loading was tested. As can be seen in FIG. 10a and FIG. 11a, both Pt@MFI (from Example 1) and PtSn@MFI (from Example 2) are initially active but not stable under reaction conditions. Both catalysts deactivate in short time (<5 h). After regeneration tests, the reactivity of Pt@MFI and PtSn@MFI also show fast deactivation (see FIG. 10 and FIG. 11). It should be noted that the PtSn@MFI catalyst shows high propylene selectivity than the Pt@MFI catalyst, although its activity is slightly lower than that of the Pt@MFI sample. Agglomeration of Pt nanoparticles has been observed with both Pt@MFI and PtSn@MFI samples after three catalytic cycles, as shown in FIG. 14 and FIG. 15. Notably, the K—Pt@MFI sample shows significantly higher reactivity than Pt@MFI and PtSn@MFI (see FIG. 12a). The high activity of K—Pt@MFI (from Example 3) and the presence of subnanometric Pt clusters in the MFI zeolite is preserved for at least three reaction cycles (see FIG. 12 and FIG. 16). Since Pt clusters are observed in the K—Pt@MFI sample while only Pt nanoparticles are present in the Pt@MFI and PtSn@MFI samples, the high reactivity for propane dehydrogenation appears to be associated with Pt clusters. Nevertheless, the selectivity for propylene on the K—Pt@MFI sample is not satisfactory, due to the formation of a large quantity of cracking products ($CH_4$, $C_2H_4$ and $C_2H_6$).

Figure 13:
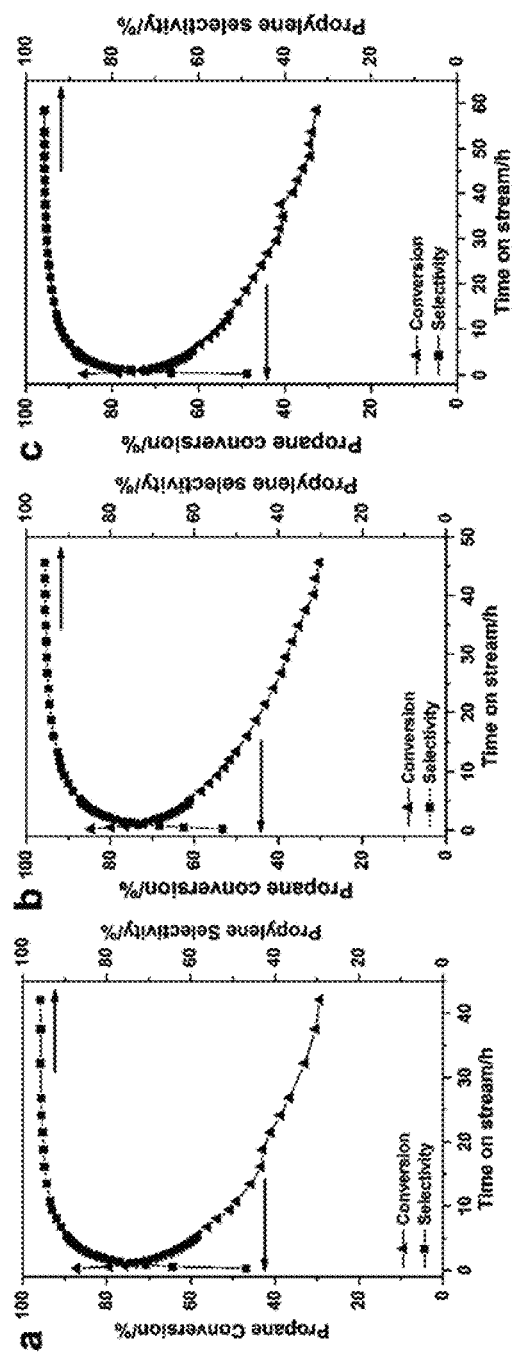
FIG. 13 shows the catalytic performance (conversion of propane and selectivity to propylene) of K—PtSn@MFI catalyst (1.48 wt % of Pt, 0.62 wt % of Sn and 0.64 wt. % of K) of Example 4 for propane dehydrogenation at 600° C. Reaction conditions: 100 mg K—PtSn@MFI catalyst, propane/$N_2$ (5 mL propane and 16 mL $N_2$). The catalyst was reduced by $H_2$ at 600° C. before the atmosphere was switched to reaction feed gas. The deactivated catalyst was regenerated by calcination in air at 600° C. for 2 h and then reduced by $H_2$ at 600° C. for 1 h. (a) first cycle, (b) second cycle and (c) third cycle.
Figure 17:
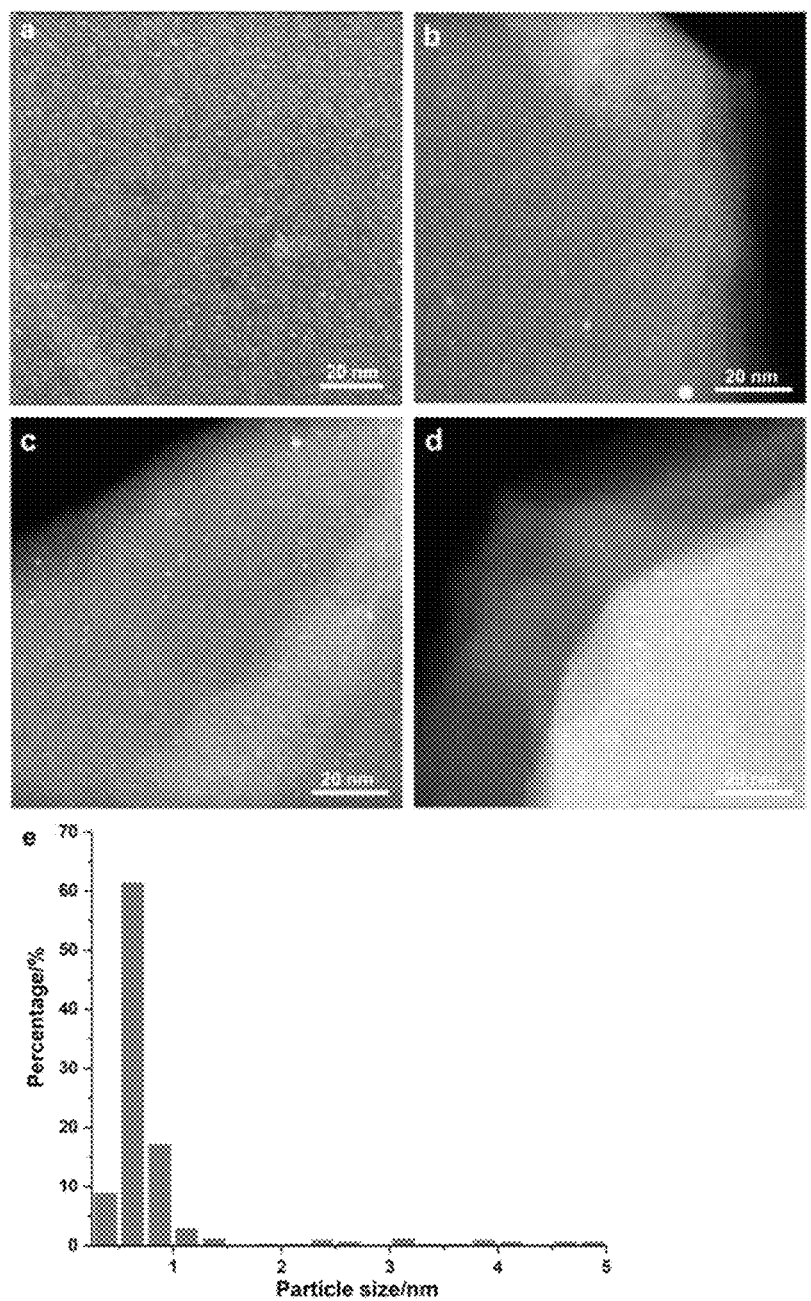
FIG. 17 shows STEM images of the K—PtSn@MFI sample of Example 4 after three cycles of propane dehydrogenation reaction. The above images were obtained with the powder sample. Sintering of Pt into nanoparticles can be observed in some areas. >90% of Pt particles are smaller than 2 nm in the K—PtSn@MFI sample after three cycles of propane dehydrogenation reaction.
Figure 18:
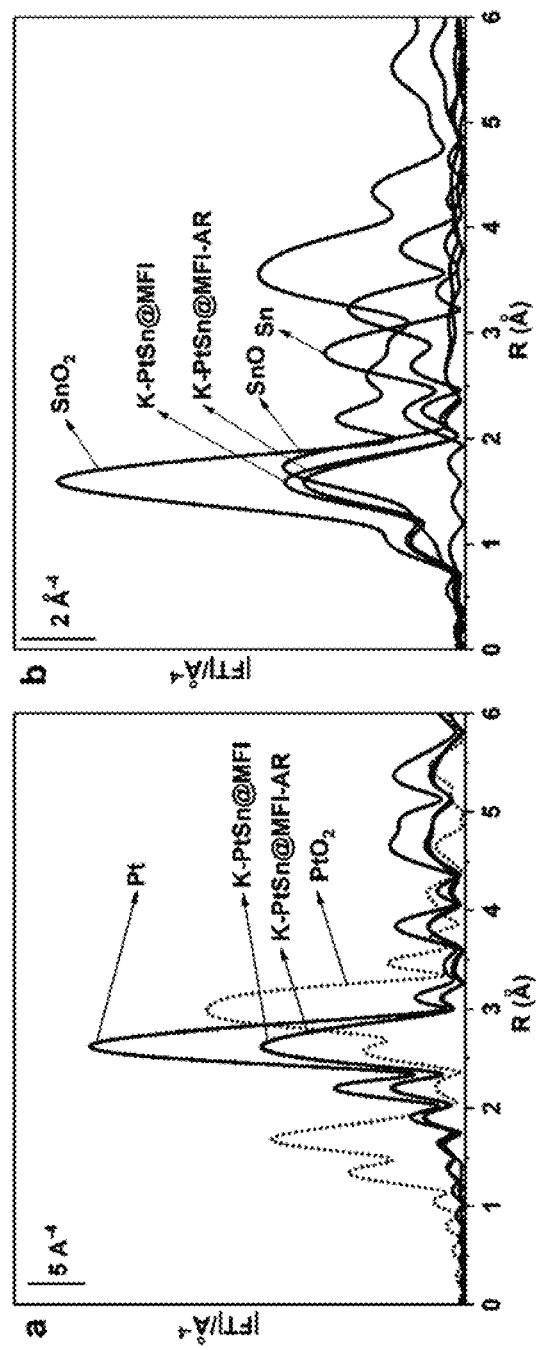
FIG. 18(a) shows a Pt-edge EXAFS spectra of K—PtSn@MFI samples of Example 4 before (named as K—PtSn@MFI) and after propane dehydrogenation reaction (named as K—PtSn@MFI-AR).
FIG. 18(b) shows Sn-edge EXAFS spectra of K—PtSn@MFI samples of Example 4 before and after propane dehydrogenation reactions. All the spectra of the K—PtSn@MFI samples were recorded after in situ reduction by $H_2$ at 600° C. The reference samples were measured directly. The fitting results of the used K—PtSn@MFI after propane dehydrogenation reaction are shown in Table 2 and Table 3.

To improve the selectivity for propylene and to maintain the high reactivity, highly dispersed Sn (~0.7 wt %) was introduced as a promoter. As shown in FIG. 13a, at 50% conversion of propane, the selectivity for propylene of the K—Pt@MFI sample is 86% while in the case of K—PtSn@MFI the selectivity for propylene is 93% at the same conversion. Moreover, after >40 h of time on stream, the conversion of propane is still above 30%, with a selectivity for propylene of >95%. After three consecutive cycles for propane dehydrogenation reaction, no loss of activity is observed (see FIG. 17). EXAFS results also confirm the stability of Pt and Sn species in the K—PtSn@MFI sample (from Example 4) after three cycles of propane dehydrogenation reaction (see FIG. 18). The coordination number of Pt—Pt in the K—PtSn@MFI used is ~7.0, which is almost the same as for the fresh catalyst (see Table 2). By comparing the activity in the third reaction cycle, it can be seen that the K—PtSn@MFI sample is more active than the K—Pt@MFI sample, suggesting that the promotion effect of Sn, together with K, enhances the stability and selectivity.

Figure 19:
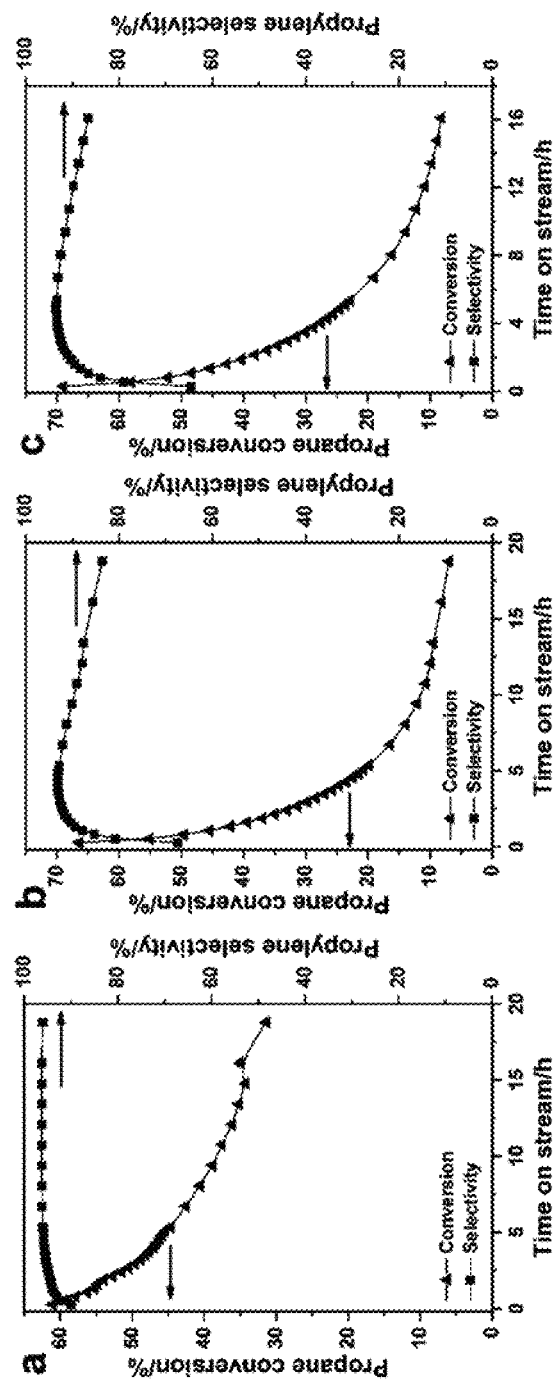
FIG. 19 shows the catalytic performance, conversion of propane (triangle) and selectivity to propylene (square), of K—PtSn/MFI catalyst prepared by incipient wetness impregnation (Example 8a) for propane dehydrogenation at 600° C. Reaction conditions: 100 mg K—PtSn/MFI catalyst, propane/$N_2$ (5 mL propane and 16 mL $N_2$). The catalyst was reduced by $H_2$ at 600° C. before the atmosphere was switched to reaction feed gas. The deactivated catalyst was regenerated by calcination in air at 600° C. for 2 h and then reduced by $H_2$ at 600° C. for 1 h. (a) first cycle and (b) second cycle and (c) third cycle.
Figure 20:
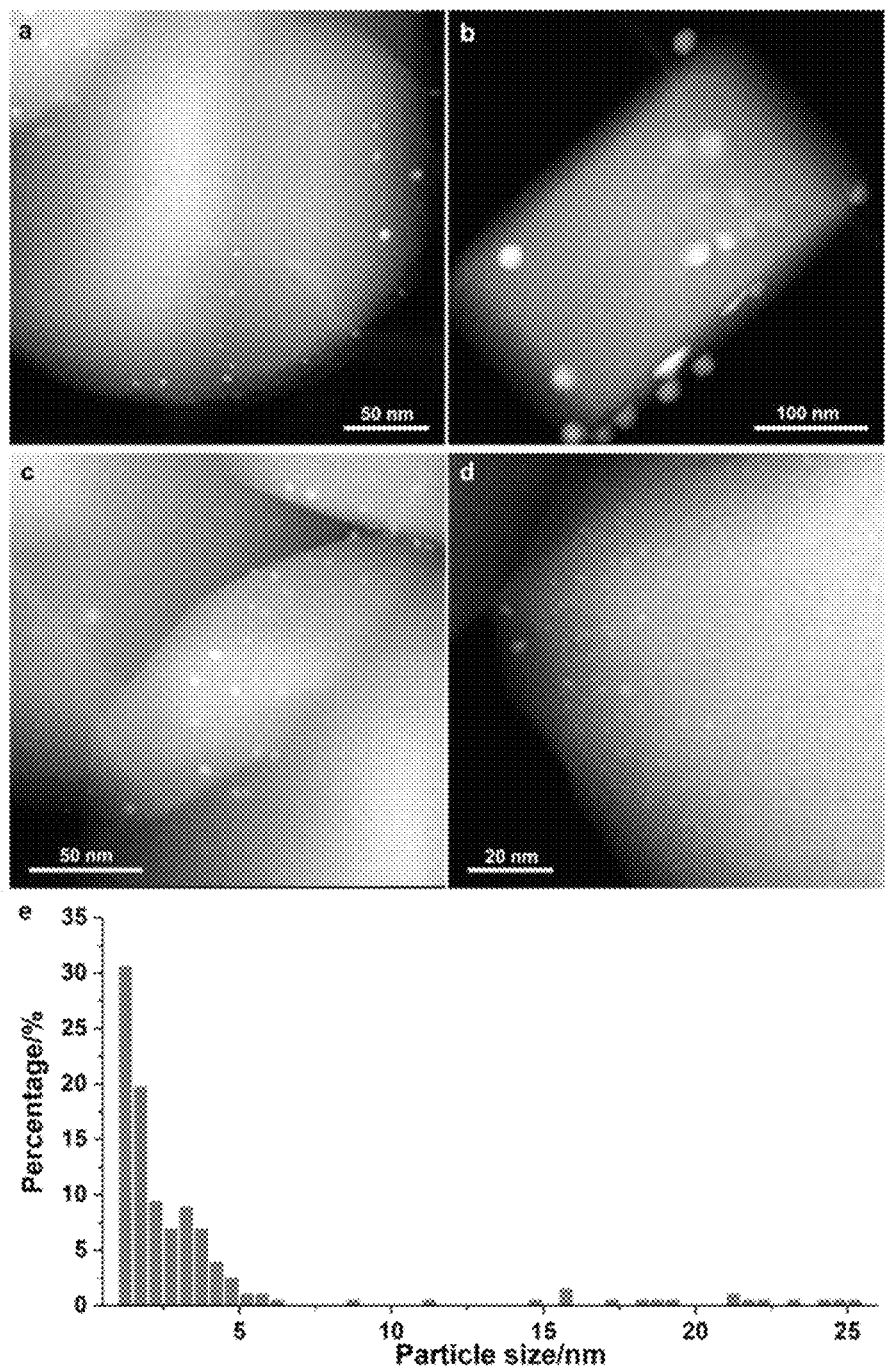
FIG. 20 shows STEM images K—PtSn/MFI catalyst prepared by conventional incipient wetness techniques (Example 8a) after three cycles of propane dehydrogenation reaction, showing the presence of presence of agglomerated Pt nanoparticles on the surface of MFI zeolite. According to the size distribution histogram, ~50% of the Pt nanoparticles are larger than 2 nm in the used K—PtSn/MFI catalyst after three cycles of propane dehydrogenation reaction.

Comparative Example 8a—Conventional Incipient Wetness Impregnation to Prepare a K—PtSn@MFI Sample A K-MFI sample with 0.7 wt % of K is prepared by the same procedure as described before, without the addition of Pt precursor in the synthesis mixture. After obtaining the K-MFI sample by hydrothermal synthesis and subsequent calcination in air, Pt (1.4 wt %) and Sn (0.7 wt %) were introduced into the K-MFI support by conventional incipient wetness impregnation. Then the catalytic performance of this sample was tested. As shown in the FIG. 19, the initial activity is good, but it also deactivated rapidly under the reaction conditions. After three cycles of dehydrogenation-regeneration cycles, a large number of agglomerated Pt nanoparticles (see FIG. 20) were evident.

Example 9. Measuring the Encapsulation Efficiency of Pt Species in MFI Zeolite In order to show the encapsulation efficiency of Pt species in the Pt-zeolite materials, a K—PtSn@MFI sample was prepared with 0.4 wt % of Pt, 0.8 wt % of Sn and 0.6 wt % of K. Firstly, a tetrapropylammonium hydroxide (TPAOH) solution was prepared by mixing 5.0 g K-free TPAOH solution (40 wt %, from Alfa-Aesar without K, product code: 17456.22), 6.24 g TPAOH (20 wt % from Sigma-Aldrich containing ~0.6 wt % of K, product code: 254533-100G) and 17.0 g of distilled water at room temperature. Then, 8.24 g Tetraethyl orthosilicate (TEOS) was hydrolyzed with tetrapropylammonium hydroxide solution (TPAOH) at room temperature for 6 h under stirring (500 rpm). The resultant solution was divided into two parts with the same weight. For each portion of the solution, 80 µL of $H_2PtCl_6$ aqueous (0.38 mol/L), 50 mg of $SnCl_4 \cdot 5H_2O$ and 150 µL of ethylenediamine were added to the above solution and the mixed solution was kept stirring for 20 min. The resultant yellow solution was then transferred to Teflon-lined autoclaves and heated in an electric oven at 175° C. for 96 h under static conditions. The amount of Pt, Sn and K in the final product was 0.4 wt %, 0.8 wt % and 0.6 wt %. After the hydrothermal process, the solid product was isolated by filtration and washed with distilled water and acetone and then dried at 60° C. Then the solid sample was calcined in flow air at 560° C. for 8 h and then 600° C. for 2 h. After calcination in air, the sample was reduced by $H_2$ at 600° C. for 2 h.

Figure 21:
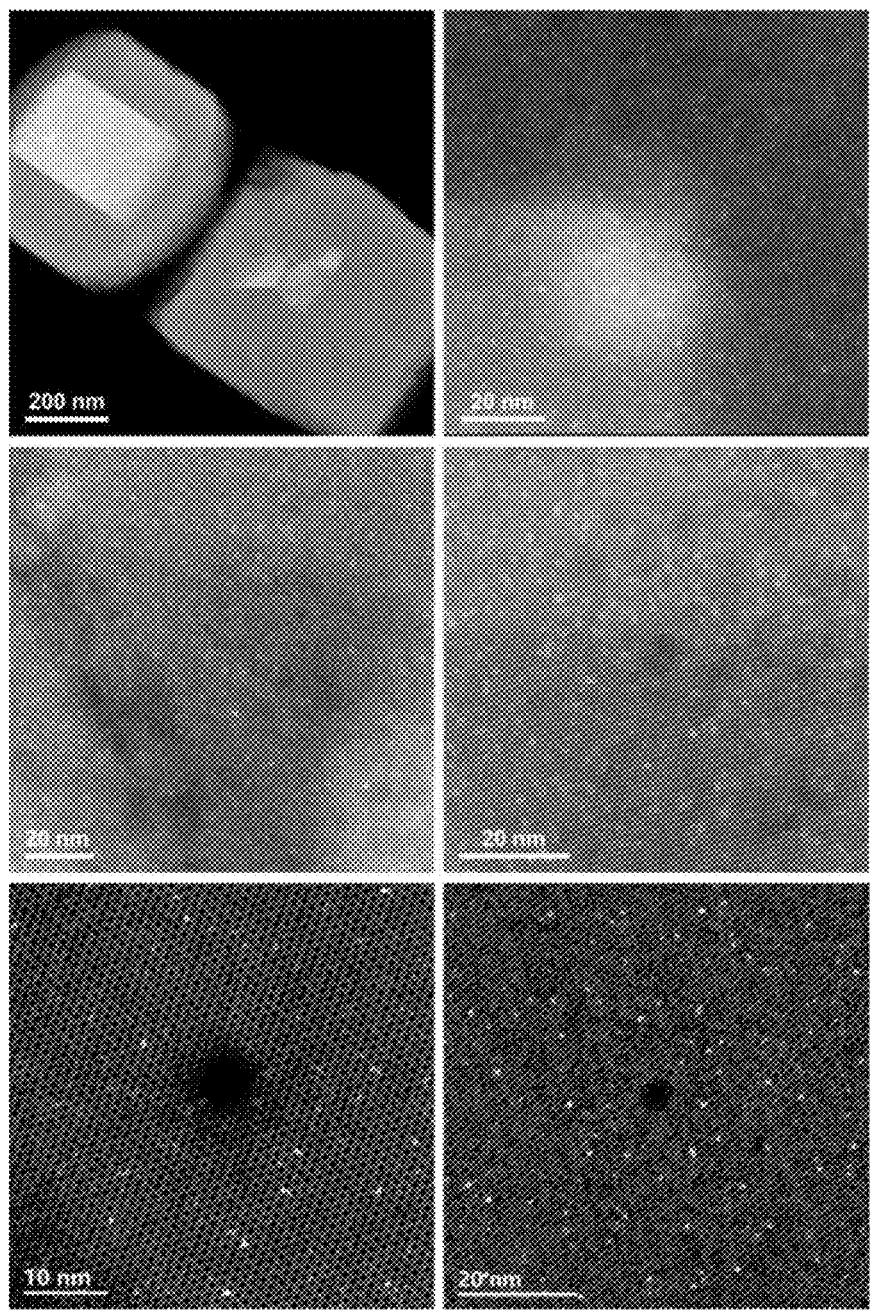
FIG. 21 shows STEM images of K—PtSn@MFI sample (Example 9) with 0.4 wt % of Pt after calcination in air and then reduced by $H_2$ at 600° C. Good dispersion of subnanometric Pt species can be observed in these images.

The structural and morphological characterizations can be found in FIG. 21. Subnanometric Pt species can be observed by the STEM images and those Pt species are mainly located in the sinusoidal channels of MFI zeolite.

Figure 22:
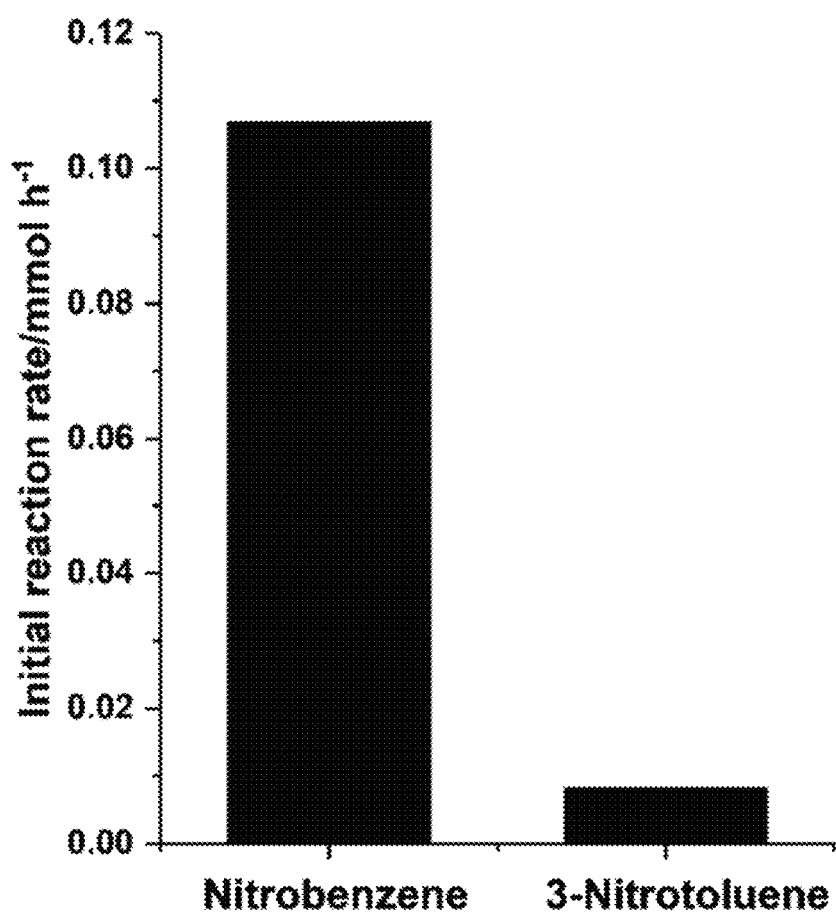
FIG. 22 shows the shape-selective catalytic properties of K—PtSn@MFI of Example 9 for hydrogenation of nitrobenzene and 3-nitrotoluene. Reaction conditions: 10 mg K—PtSn@MFI catalyst (with 0.4 wt % of Pt, 0.8 wt % of Sn and 0.6 wt % of K.) after reduced by $H_2$ at 600° C., 1 mmol nitroarenes, 2 mL ethanol as solvent, 100° C. and 10 bar of $H_2$. The initial reaction rate was calculated when the conversion is below 10%.

Considering the pore structure of MFI zeolite, hydrogenation of nitroarenes was chosen as a probe reaction. Nitrobenzene can diffuse through the 10R channels of MFI zeolite while 3-methylnitrobenzene cannot. Therefore, by comparison with the initial reaction rate of the K—PtSn@MFI sample (prepared from the above procedure), the percentage of Pt species encapsulated in MFI zeolite may be estimated. As can be seen in FIG. 22, the initial reaction rate for hydrogenation of nitrobenzene is much higher than that for hydrogenation of 3-methylnitrobenzene, implying that most of the Pt species are within the 10R channels.

A $Pt/SiO_2$ reference sample was also prepared by conventional wetness impregnation. 1.25 g $SiO_2$ (fumed silica, Aerosil 200) was mixed with 30 mL distilled water. 100 μL of $H_2PtCl_6$ aqueous (0.38 mol/L) was added to the suspension. After being kept for stirring for 2 h at room temperature, the water was removed by heating in a silicone oil bath at 120° C. The solid product was then calcined in flow air at 450° C. for 4 h and then reduced by $H_2$ at 450° C. for 3 h. The reference $Pt/SiO_2$ sample has also been tested for hydrogenation of nitrobenzene and 3-methylnitrobenzene under the same conditions as for the K—PtSn@MFI sample (with 0.4 wt % of Pt).

In an especially preferred embodiment, the percentage of the active catalytic metal that is encapsulated in the zeolite (u) is determined by the following formula:

$$\alpha = \frac{\left[\frac{LR\ SiO2}{SR\ SiO2} - \frac{LR\ zeolite}{SR\ zeolite}\right]}{\left[\frac{LR\ SiO2}{SR\ SiO2}\right]} * 100$$

wherein α is the percentage of catalytic metal encapsulated in the zeolite, LR is the large feedstock reaction rate expressed as mol of large feedstock converted per mol of catalytic metal per second, SR is the nitrobenzene reaction rate expressed as mol of nitrobenzene converted per mol of catalytic metal per second, "LR zeolite" and "SR zeolite" are to be understood as the 3-methylnitrobenzene and nitrobenzene rates of the catalyst to be tested, and "LR $SiO_2$" and "SR $SiO_2$" are to be understood as the 3-methylnitrobenzene and nitrobenzene rates of a catalyst having an equivalent metal loading in which the metal is supported on amorphous silica. Because α is the percentage of catalytic metal encapsulated in the zeolite based on the total amount of catalytic metal whether it is present in the zeolite or on the zeolite surface, α is an absolute percentage number regardless of whether the amount of metal in the zeolite or on the zeolite surface is expressed as amounts in weight or moles.

When using $Pt/SiO_2$ as the catalyst for hydrogenation of nitrobenzene and 3-methylnitrobenzene, the ratio of the initial reaction rate for these two reactions $$\left(\frac{LR\ SiO2}{SR\ SiO2}\right)$$

is 0.71, while K—PtSn@MFI gives a value of 0.0763. Therefore, according to the catalytic results, the percentage of Pt species encapsulated in MFI materials (α) in the K—PtSn@MFI (with 0.4 wt % of Pt) is 89%.

Figure 23:
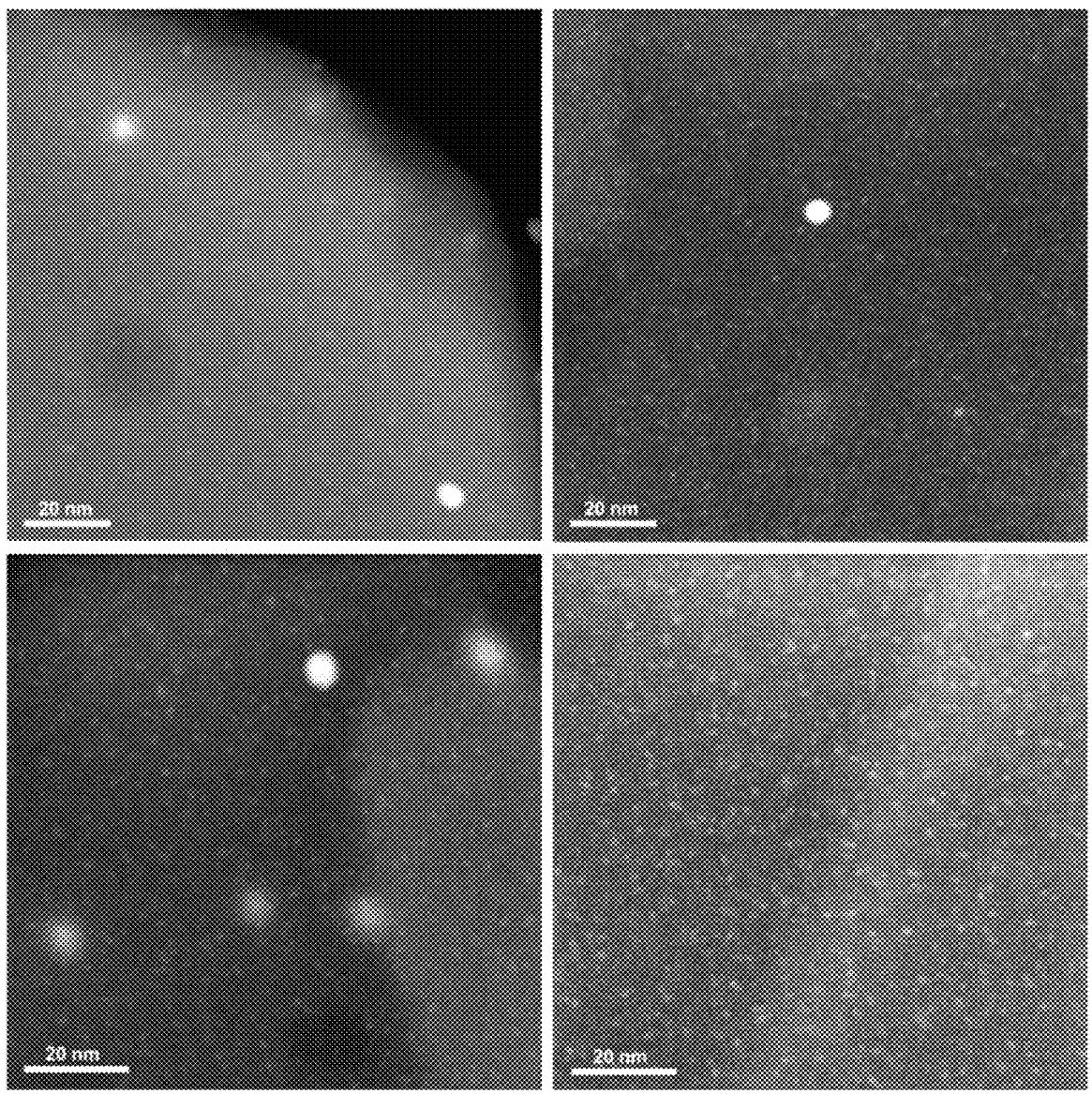
FIG. 23 shows STEM images K—PtSn@MFI (with 1.4 wt % of Pt, from Example 4) after ROR treatment. The fresh K—PtSn@MFI sample was firstly reduced by $H_2$ at 600° C. for 2 h. Then the sample was calcined in air at 650° C. for 2 h. After the calcination treatment in air, the sample was reduced again by $H_2$ at 600° C. for 2 h.

Example 10. Measuring the Stability of Pt Species in K—PtSn@MFI Sample During Reduction-Oxidation-Reduction (ROR) Treatment at High Temperature The ROR treatment on K—PtSn@MFI (with 1.4 wt % of Pt, from Example 4) was carried out by reduction treatment at 600° C. and oxidation treatment at 650° C. According to the STEM images shown in FIG. 23, a large number of subnanometric Pt clusters can still be observed. Nevertheless, we have also observed the formation of some Pt nanoparticles on the external surface of MFI zeolite crystallites, which should be caused by the slight sintering of Pt species during the ROR treatment, especially for those Pt species located on the surface or subsurface of MFI zeolite crystallites. The high stability of encapsulated Pt species in K—PtSn@MFI sample during high-temperature oxidation-reduction treatment is also reflected on the STEM images of the used catalyst show in FIG. 17 and EXAFS results shown in FIG. 18. Since the regeneration of deactivated catalyst requires calcination in air at 600° C. and then reduction by $H_2$ at 600° C. before the catalytic test, the used catalyst after three tests show similar Pt—Pt coordination number, indicating the excellent stability of Pt species. It can be concluded that, the majority of the subnanometric species encapsulation in MFI zeolites remain stable during the high-temperature ROR treatment.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the example and descriptions set forth herein, but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A medium or large pore synthetic zeolite comprising:
    a. at least 0.02 wt %, based on the weight of the medium or large pore synthetic zeolite, of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, which is present as catalytic metal particles, wherein at least 60% by number of said catalytic metal particles have a particle size of 2.0 nm or less,
    b. at least 0.005 wt %, based on the weight of the medium or large pore synthetic zeolite, of an alkali metal or metal alkaline earth selected from the group consisting of Li, Na, K, Cs, Ca, Mg, Ba and Sr and combinations thereof, and
    c. at least 0.01 wt %, based on the weight of the medium or large pore synthetic zeolite, of an additional extra-framework metal selected from the group consisting of Ga, Zn, Sn, Fe, Ti, Zr, Nb, Hf, Ta, Mo and combinations thereof, wherein, if the medium or large pore synthetic zeolite comprises in a zeolite framework a trivalent element Y selected from the group consisting of Al, B, Ga, Fe and combinations thereof, the $SiO_2:Y_2O_3$ molar ratio is greater than 200:1, wherein the medium or large pore synthetic zeolite is in as-synthesized form and further comprises a structure-directing agent.

2. The medium or large pore synthetic zeolite as claimed in claim 1, wherein at least 70% by number of said catalytic metal particles have a particle size of 2.0 nm or less.

3. The medium or large pore synthetic zeolite as claimed in claim 1, which is a 10 or 12-membered ring zeolite.

4. The medium or large pore synthetic zeolite as claimed in claim 1 which is a medium pore zeolite of framework type MFI, EUO, MTT, AFO, MEL, MFS, FER, TON or MWW; or is a large-pore zeolite of framework type FAU, BEA, BEC, MOR or LTL.

5. The medium or large pore synthetic zeolite as claimed in claim 1 in which the catalytic metal is selected from the group consisting of Ru, Rh, Pd, Ag, Os, Ir, Pt, Au, Re, and combinations thereof.

6. The medium or large pore synthetic zeolite as claimed in claim 1 in which the catalytic metal is Pt.

7. The medium or large pore synthetic zeolite as claimed in claim 1 wherein the alkali metal or alkaline earth metal is present at 0.1 to 5.0 wt % based on the weight of the medium or large pore synthetic zeolite.

8. The medium or large pore synthetic zeolite as claimed in claim 1 in which the alkali metal is Na or K.

9. The medium or large pore synthetic zeolite as claimed in claim 1, wherein a molar ratio of the catalytic metal to the alkali metal or alkaline earth metal is from 0.2 to 10.

10. The medium or large pore synthetic zeolite as claimed in claim 1, which also comprises at least 0.01 wt % of an additional extra-framework metal selected from the group consisting of Ga, Zn, Fe, Ti, Zr, Nb, Hf, Ta, Mo and combinations thereof.

11. The medium or large pore synthetic zeolite as claimed in claim 1 which comprises Sn as the additional extra-framework metal.

12. The medium or large pore synthetic zeolite as claimed in claim 1, wherein the structure directing agent is an organic structure directing agent.

13. A Hydrogenation or dehydrogenation catalyst comprising the medium or large pore synthetic zeolite of claim 1 and at least 0.1 wt %, based on the weight of the hydrogenation or dehydrogenation, of a binder.

14. A process for the preparation of a medium or large pore synthetic zeolite comprising:
a. providing a synthesis mixture for forming the medium or large pore synthetic zeolite framework, the synthesis mixture comprising at least a source of Si, at least one catalytic metal precursor comprising a source of a catalytic metal selected from the group consisting of Ru, Rh, Pd, Ag, Os, Ir, Pt, Au, Mo, W, Re, Co, Ni, Zn, Cr, Mn, Ce, Ga, Cu and combinations thereof, a source of at least one alkali metal or alkaline earth metal selected from the group consisting of Li, Na, K, Cs, Ca, Mg, Ba, Sr and combinations thereof, and a source of an additional extra-framework metal selected from the group consisting of Ga, Zn, Sn, Fe, Ti, Zr, Nb, Hf, Ta, Mo and combinations thereof, and wherein, if a trivalent metal element Y selected from Al, B, Ga, Fe and combinations thereof is present, the $SiO_2:Y_2O_3$ ratio is greater than 200:1,
b. heating said synthesis mixture under crystallization conditions to form crystals of said synthetic zeolite, and
c. recovering said crystals of the medium or large pore synthetic zeolite from the synthesis mixture, wherein if a trivalent metal element Y selected from Al, B, Ga, Fe and combinations thereof is present in the medium or large pore synthetic zeolite, the $SiO_2:Y_2O_3$ ratio is greater than 200:1, wherein the at least one catalytic metal is present on said crystals of the medium or large pore synthetic zeolite as catalytic metal particles, wherein at least 60% by number of said catalytic metal particles have a particle size of 2.0 nm or less, and wherein said crystals of the medium or large pore synthetic zeolite comprise at least 0.02 wt %, based on the weight of the medium or large pore synthetic zeolite, of the at least one catalytic metal, at least 0.005 wt %, based on the weight of the medium or large pore synthetic zeolite, of the at least one alkali metal or alkaline earth metal, and at least 0.01 wt %, based on a weight of the medium or large pore synthetic zeolite, of the at least one additional extra-framework metal, and wherein the medium or large pore synthetic zeolite is in as-synthesized form and further comprises a structure-directing agent.

15. The process according to claim 14, wherein the synthesis mixture has a molar ratio of $SiO_2:Y_2O_3$ of greater than 500:1.

16. The process according to claim 14 wherein the synthesis mixture also comprises a source of hydroxide ions and/or fluoride ions, a source of organic structure directing agent and water.

17. The process according to claim 14 wherein the at least one catalytic metal precursor includes metal complexes stabilized by ligands selected from the group consisting of N-containing ligands, 0-containing ligands, S-containing ligands and P-containing ligands.

18. The process according to claim 14 wherein the synthesis mixture comprises an organic structure directing agent which is a quaternary ammonium cation.

19. A process for converting a feedstock comprising an organic compound to a conversion product which comprises a step of contacting said feedstock with a catalyst comprising the medium or large pore synthetic zeolite as claimed in claim 1.

20. The process as claimed in claim 19, which is a hydrogenation or dehydrogenation process.

21. The process as claimed in claim 19, which is a hydroprocessing process, a catalytic reforming process, or a combination thereof.

* * * * *